US011431566B2

(12) United States Patent
Kane

(10) Patent No.: US 11,431,566 B2
(45) Date of Patent: Aug. 30, 2022

(54) DEVICES, SYSTEMS, AND METHODS FOR OBTAINING SENSOR MEASUREMENTS

(71) Applicant: Canon Solutions America, Inc., Melville, NY (US)

(72) Inventor: Jeffrey David Kane, Boynton Beach, FL (US)

(73) Assignee: Canon Solutions America, Inc., Melville, NY (US)

(*) Notice: Subject to any disclaimer, the term of this patent is extended or adjusted under 35 U.S.C. 154(b) by 0 days.

(21) Appl. No.: 17/129,499

(22) Filed: Dec. 21, 2020

(65) Prior Publication Data

US 2022/0200854 A1 Jun. 23, 2022

(51) Int. Cl.
*H04L 41/0816* (2022.01)
*H04W 84/18* (2009.01)

(52) U.S. Cl.
CPC ........ *H04L 41/0816* (2013.01); *H04W 84/18* (2013.01)

(58) Field of Classification Search
CPC .. B41J 2/17546; B41J 2/17556; B41J 2/17566; B41J 2/1753; B41J 2/17553; G06F 21/44; G06F 2213/0016; G06F 13/4291; G06F 21/608; G06F 13/42; G06F 21/60; G06F 1/08; G06F 1/12; G01F 23/0076
See application file for complete search history.

(56) References Cited

U.S. PATENT DOCUMENTS

| | | | |
|---|---|---|---|
| 5,623,878 | A | 4/1997 | Baxter |
| 7,243,270 | B2 | 7/2007 | Taniguchi |
| 7,369,948 | B1 | 5/2008 | Ferenczi |
| 10,102,056 | B1 | 10/2018 | Goldberg |
| 2006/0253570 | A1 | 11/2006 | Biswas |
| 2006/0289280 | A1* | 12/2006 | Furuya ............... G03G 15/1615 198/806 |
| 2008/0109186 | A1 | 5/2008 | Ferenczi |
| 2009/0052912 | A1 | 2/2009 | Soji |
| 2009/0195350 | A1 | 8/2009 | Tsern |
| 2011/0295401 | A1* | 12/2011 | Barea ................. B65H 63/0321 700/97 |
| 2012/0032283 | A1 | 2/2012 | Frey |

(Continued)

OTHER PUBLICATIONS

Marisa Alia-Novobilski, AFRL, American Semiconductor create flexible system-on-chip for 'internet of things', Dec. 2017.

(Continued)

*Primary Examiner* — Michael A Keller
*Assistant Examiner* — Thao D Duong
(74) *Attorney, Agent, or Firm* — Canon U.S.A., Inc. IP Division

(57) ABSTRACT

Some embodiments of a system comprise a plurality of sensor arrays, wherein each sensor array of the plurality of sensors arrays includes multiple sensors, includes a wireless transceiver, includes one or more processors, and is configured to generate sensed data, according to sensor settings, while moving along a path; while moving along the path, transmit data to, and receive data from, other sensor arrays of the plurality of sensor arrays that are also moving along the path; and, while moving along the path, change one or more of the sensor settings based on the received data.

22 Claims, 16 Drawing Sheets

(56) References Cited

U.S. PATENT DOCUMENTS

| | | | | |
|---|---|---|---|---|
| 2014/0129866 | A1* | 5/2014 | Hallman | H04L 67/12 |
| | | | | 713/340 |
| 2015/0134954 | A1 | 5/2015 | Walley | |
| 2018/0139517 | A1 | 5/2018 | Schwartz | |
| 2018/0324199 | A1 | 11/2018 | Crotinger | |
| 2019/0051179 | A1* | 2/2019 | Alvarez | H04W 12/63 |
| 2019/0095266 | A1 | 3/2019 | Chen | |
| 2019/0324438 | A1 | 10/2019 | Cella | |
| 2020/0171836 | A1* | 6/2020 | Gardner | B41J 2/17546 |
| 2020/0173679 | A1* | 6/2020 | O'Reilly | F24F 11/38 |
| 2020/0204883 | A1 | 6/2020 | Gang | |
| 2020/0226906 | A1 | 7/2020 | McKinley | |
| 2020/0249342 | A1* | 8/2020 | Barnes | G01S 7/288 |
| 2020/0267057 | A1 | 8/2020 | Garvey | |
| 2021/0129842 | A1* | 5/2021 | Wang | H04J 3/0644 |
| 2021/0189764 | A1* | 6/2021 | Kincaid | E05B 17/10 |
| 2021/0216491 | A1* | 7/2021 | Weaver | G06F 21/44 |

OTHER PUBLICATIONS

Azka Amin et al., Collaborative Wireless Power Transfer in Wireless Rechargeable Sensor Networks, Jun. 2020.

Shang Gao et al., Airborne Wireless Sensor Networks for Airplane Monitoring System, Wireless Communications and Mobile Computing, May 2018.

Berenger Ossete Gombe et al., A SAW Wireless Sensor Network Platform for Industrial Predictive Maintenance, Jun. 15, 2017.

Xinyu Liu et al., Paper-based piezoresistive MEMS sensors, Jul. 2011.

Saman Naderiparizi et al., WISPCam: A Battery-Free RFID Camera, Apr. 2015.

Adam B. Noel et al., Structural Health Monitoring Using Wireless Sensor Networks: A Comprehensive Survey, IEEE Communications Surveys & Tutorials, vol. 19, No. 3, Third Quarter 2017, Aug. 2017.

Pooja Rai et al., Wireless Sensor Network for Machine Health Monitoring, Mar. 2015.

Pooja Rai et al., Control and Monitoring Machine using Wireless Sensor Network, May 2015.

Alanson P. Sample et al., Analysis, Experimental Results, and Range Adaptation of Magnetically Coupled Resonators for Wireless Power Transfer, Jun. 2010.

Alanson P. Sample et al., Design of an RFID-Based Battery-Free Programmable Sensing Platform, Nov. 2008.

Dongjin Seo, Neural Dust: Ultrasonic Biological Interface, Electrical Engineering and Computer Sciences University of California at Berkeley, Dec. 1, 2018.

Joshua R. Smith et al., A Wirelessly-Powered Platform for Sensing and Computation, Sep. 2006.

Muhammad Syafrudin et al., Performance Analysis of IoT-Based Sensor, Big Data Processing, and Machine Learning Model for Real-Time Monitoring System in Automotive Manufacturing, Sep. 2018.

Ankit Tiwari et al., Energy-Efficient Wireless Sensor Network Design and Implementation for Condition-Based Maintenance, Mar. 2007.

* cited by examiner

US 11,431,566 B2

DEVICES, SYSTEMS, AND METHODS FOR OBTAINING SENSOR MEASUREMENTS

BACKGROUND

Technical Field

The present disclosure generally relates to devices, systems, and methods for obtaining sensor measurements of a device or system.

Background

Modern machines and systems utilize various built-in sensors to measure a number of properties, detect events or changes in an environment, and output information related to the measurements. For example, image-forming devices (e.g., printers, copiers, multifunction peripherals), manufacturing assembly lines, and rail systems (e.g., subway rails, roller-coaster rails, train rails) may include various built-in sensors to monitor aspects of the devices or systems.

SUMMARY

Some embodiments of a device comprise a plurality of sensor arrays, wherein each sensor array of the plurality of sensors arrays includes multiple sensors, includes a wireless transceiver, includes one or more processors, and is configured to generate sensed data, according to sensor settings, while moving along a path; while moving along the path, transmit data to, and receive data from, other sensor arrays of the plurality of sensor arrays that are also moving along the path; and while moving along the path, change one or more of the sensor settings based on the received data.

Some embodiments of a device comprise multiple sensors that are configured to generate sensed data according to sensor settings; a wireless transceiver; and one or more processors that are configured to cause the device to, while moving along a path, generate the sensed data according to the sensor settings; while moving along the path, receive data from one or more sensors of one or more other devices that are also moving along the path; and, while moving along the path, change one or more of the sensor settings based on the received data.

Some embodiments of a method comprising, while traveling along a path, controlling two or more sensors to generate sensed data according to one or more sensor settings; while traveling along the path, receiving data from one or more sensor arrays that are traveling along the path; and, while traveling along the path, reconfiguring the respective settings of two or more sensors based on the data received from the one or more sensor arrays.

DETAILED DESCRIPTION

The following paragraphs describe certain explanatory embodiments. Other embodiments may include alternatives, equivalents, and modifications. Additionally, the explanatory embodiments may include several features, and a particular feature may not be essential to some embodiments of the devices, systems, and methods that are described herein. Furthermore, some embodiments include features from two or more of the following explanatory embodiments.

Also, as used herein, the conjunction "or" generally refers to an inclusive "or," though "or" may refer to an exclusive "or" if expressly indicated or if the context indicates that the "or" must be an exclusive "or."

Figure 1:
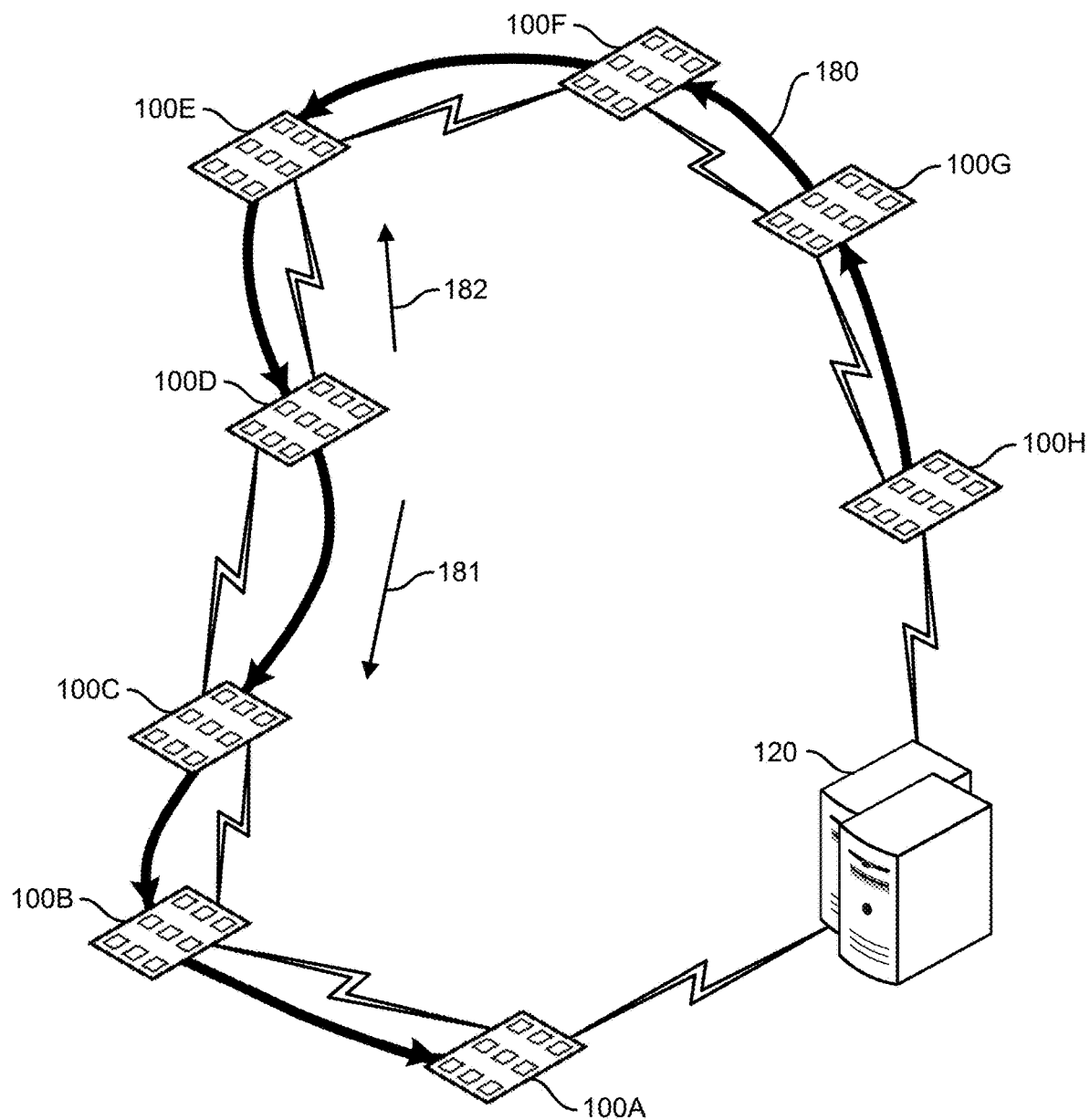
FIG. 1 illustrates an example embodiment of a system for obtaining sensor measurements.

FIG. 1 illustrates an example embodiment of a system for obtaining sensor measurements. The system includes a plurality of sensor arrays 100A-H and one or more remote computing devices 120, which may be anomaly-detection devices. Each of the sensors arrays 100A-H includes a plurality of respective sensors. Examples of sensors include the following: temperature sensors, vibration sensors, pressure sensors, gyroscopes, color sensors, light sensors (e.g., visible light, infrared light), humidity sensors, chemical sensors, and voltage sensors.

The plurality of sensor arrays 100A-H travel on a path 180 in a downstream direction 181, which is opposite to an upstream direction 182. As they travel the path, the sensor arrays 100A-H may be conveyed by other objects or devices. For example, the path 180 may be an image-forming path in an image-forming device (e.g., a printer), and the sensor arrays 100A-H may be conveyed on the path 180 by rollers in the image-forming device. Also for example, the path 180 may be a manufacturing path in an assembly line (e.g., an assembly line in which the manufacturing is performed by robots), and the sensor arrays 100A-H may each be carried by a respective article of manufacture (e.g., an electronic device, an automobile, an appliance, a semiconductor wafer) or a respective carrier (which can hold an article of manufacture) that travels along the manufacturing path.

While traveling along the path 180, each of the sensor arrays 100A-H can obtain measurements for their respective sensors and generate sensed data that include the measurements. Also, because the respective locations of the sensor arrays 100A-H change as the sensor arrays 100A-H travel along the path 180, measurements that are obtained at different times may also be obtained in different locations. For example, as sensor array 100A travels the path 180, starting from the location of sensor array 100H in FIG. 1, sensor array 100A may obtain measurements at the each of the locations of sensor arrays 100A-H in FIG. 1. Thus, for example, some measurements may be obtained at the location of sensor array 100G, and some measurements may be obtained at the location of sensor array 100C.

Additionally, while traveling along the path 180, each of the sensor arrays 100A-H can communicate with (e.g., send data to, receive data from) one or more other sensor arrays 100A-H, such as the closest neighboring sensor arrays 100A-H. For example, in some embodiments, the sensor arrays 100A-H establish a dynamic network (e.g., an ad hoc network). Each of the sensor arrays 100A-H may relay communications (e.g., data) between the other sensor arrays 100A-H. For example, if sensor array 100A cannot directly communicate with sensor array 100D but can directly communicate with sensor array 1006, and sensor array 100B can also directly communicate with sensor array 100C, and sensor array 100C can also directly communicate with sensor array 100D, then sensor arrays 100B-C may relay communications between sensor arrays 100A and 100D.

Figure 2:
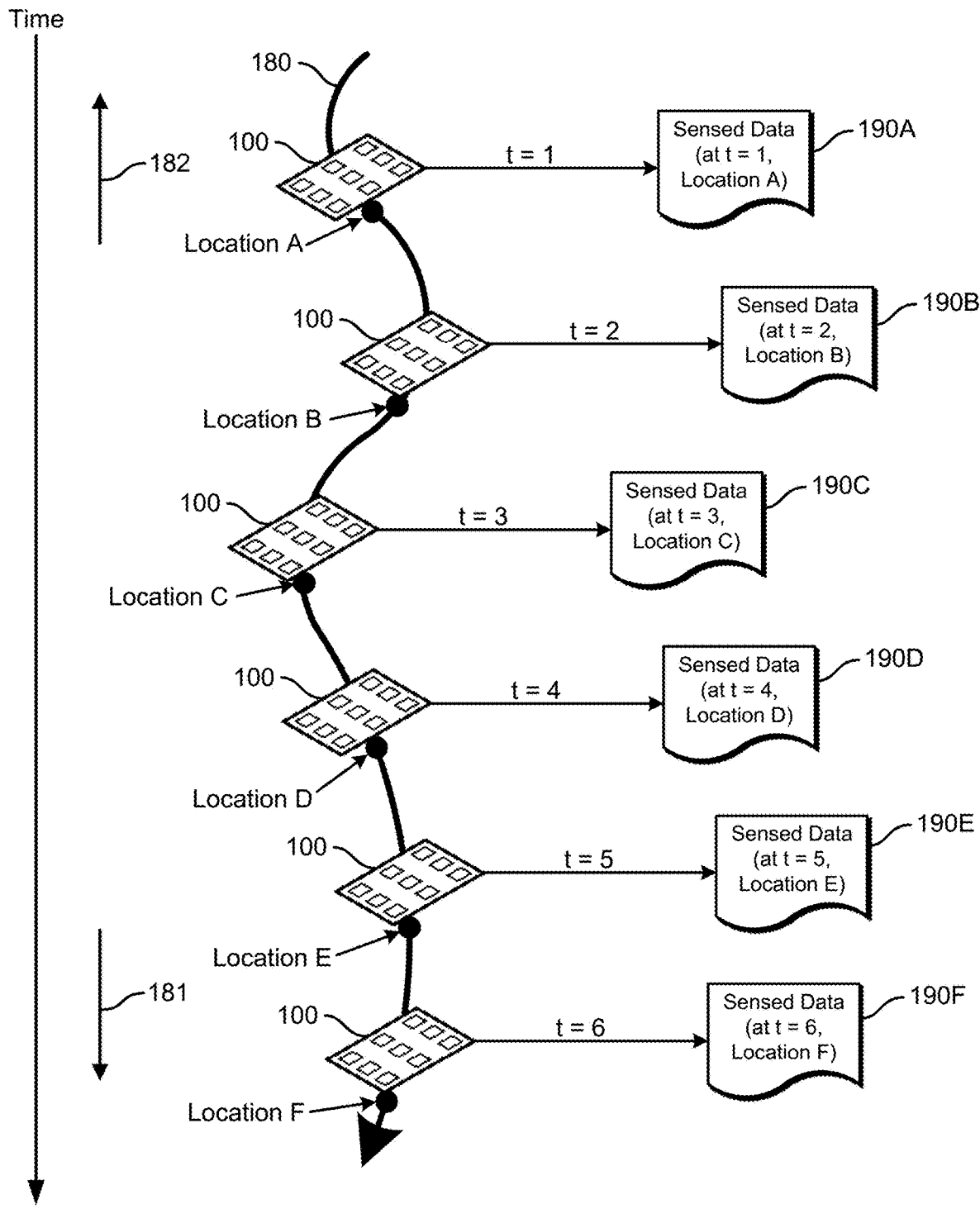
FIG. 2 illustrates an example embodiment of a sensor array traveling on a path.

FIG. 2 illustrates an example embodiment of a sensor array traveling on a path. As the sensor array 100 moves along the path 180, the sensor array 100 generates sensed data. For example, at time t=1, when the sensor array is at location A, the sensor array 100 generates a first group of sensed data 190A. And, at time t=4, when the sensor array is at location D, the sensor array 100 generates a fourth group of sensed data 190D. Thus, each group of sensed data 190A-F is generated at a corresponding location and a corresponding time. Also, a group of sensed data can include sensed data that were generated by one or more sensors of a sensor array during an interval of time. For example, if a sensor array includes four sensors and if an interval is one second, then a group of sensed data may include sensed data that were generated by the four sensors during the one-second interval.

Figure 3:
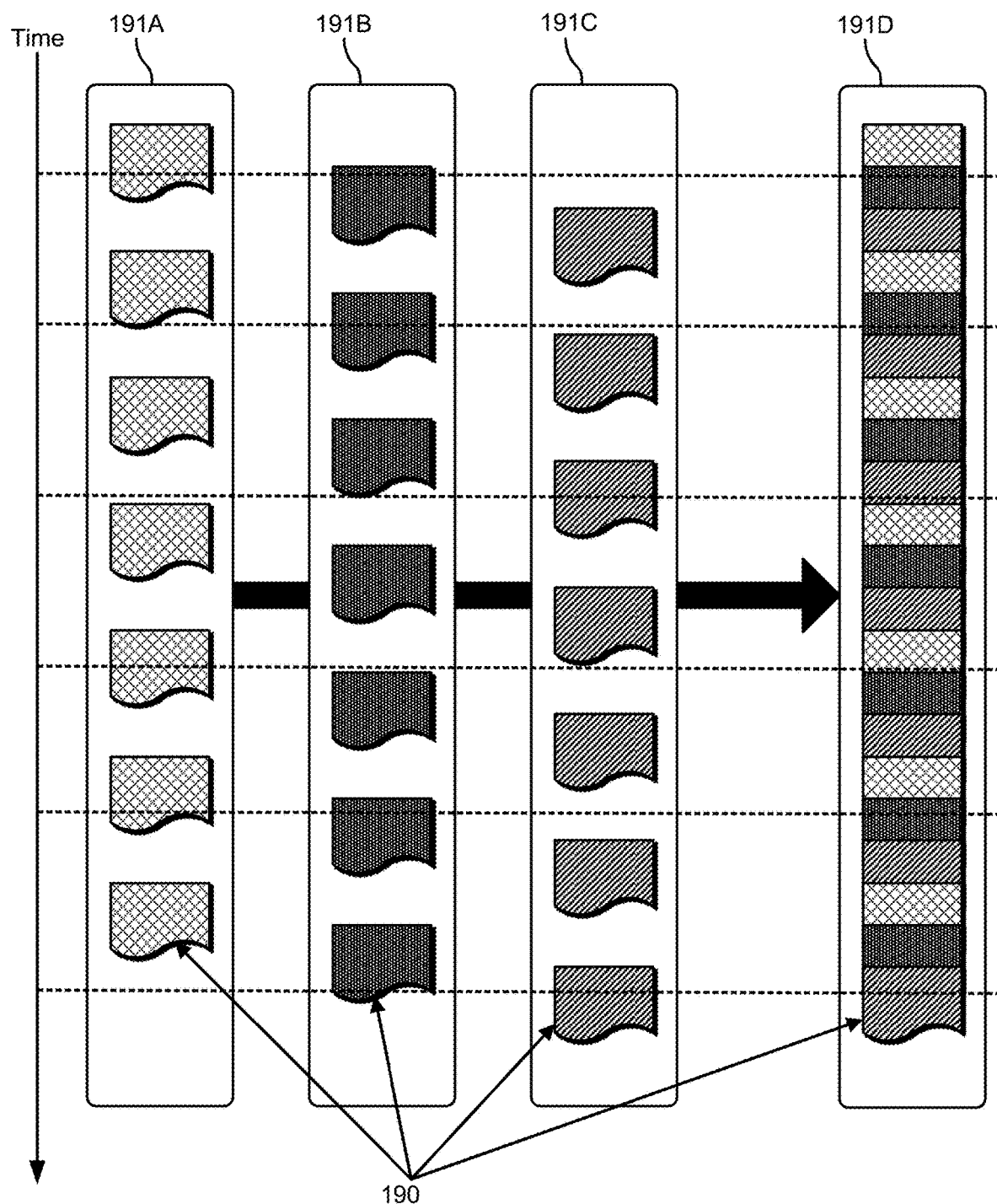
FIG. 3 illustrates example embodiments of groups of sensed data.

FIG. 3 illustrates example embodiments of groups of sensed data. A first set of sensed data 191A includes groups of sensed data 190 that were generated by a first sensor array, a second set of sensed data 191B includes groups of sensed data 190 that were generated by a second sensor array, and a third set of sensed data 191C includes groups of sensed data 190 that were generated by a third sensor array (the three sensor arrays are at different locations on a path). A remote computing device (e.g., an anomaly-detection device) or a sensor array may obtain the three sets 191A-C and merge them, thereby forming a merged set 191D that includes all of the groups of sensed data 190. Also, in the merged set 191D, the groups of sensed data 190 may be arranged according to time (arranged according to temporal order). In such embodiments (e.g., the embodiment in FIG. 3), when multiple sensor arrays are generating groups of sensed data during a period of time, the merged set 191D will intersperse groups of sensed data 190 that were generated by different sensor arrays.

Figure 4:
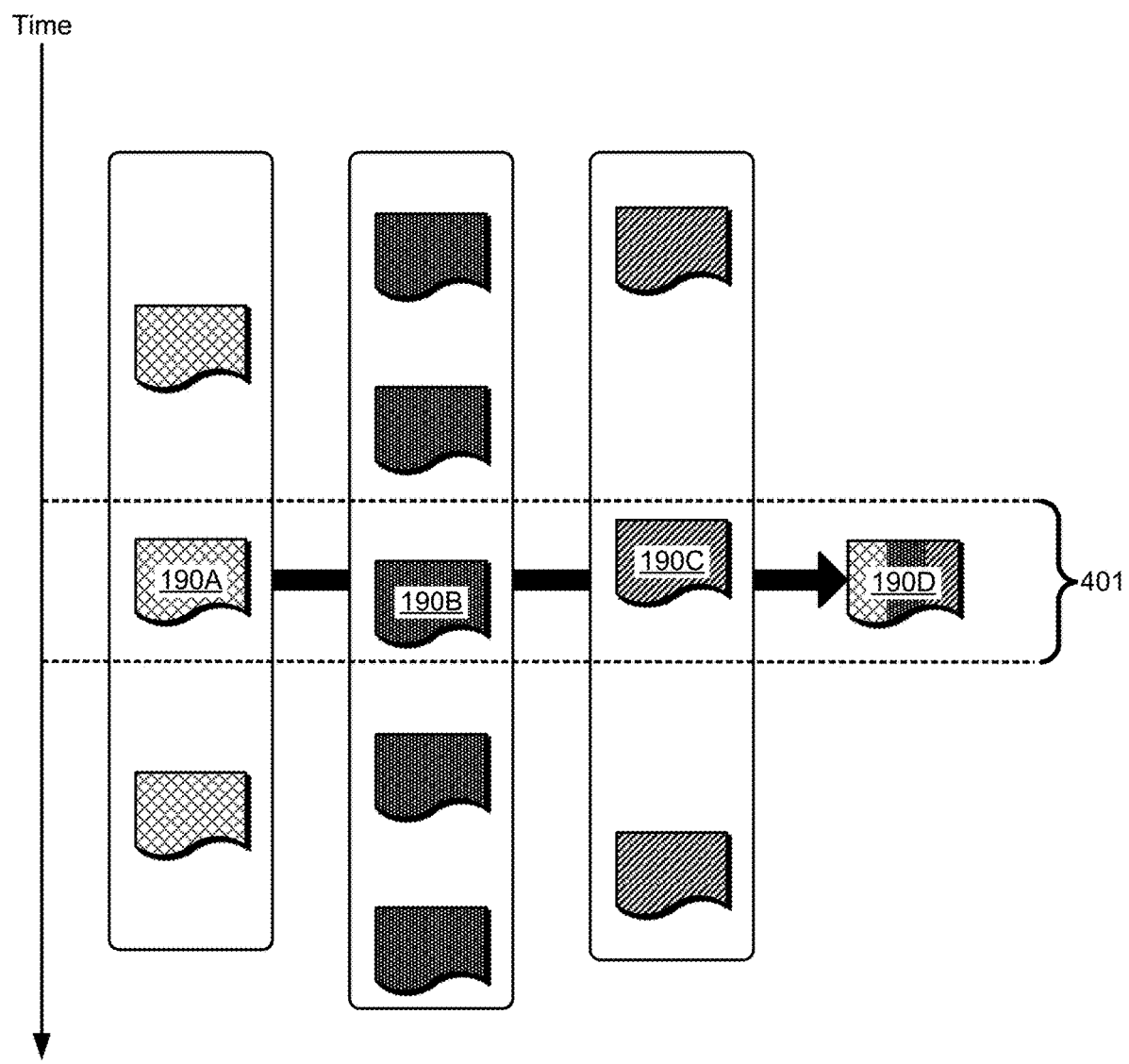
FIG. 4 illustrates example embodiments of groups of sensed data.

FIG. 4 illustrates example embodiments of groups of sensed data. FIG. 4 illustrates a first group of sensed data 190A that was generated by a first sensor array, a second group of sensed data 190B that was generated by a second sensor array, and a third group of sensed data 190C that was generated by a third sensor array. Also, these groups of sensed data 190A-C were generated within a predetermined time interval 401 (e.g., 0.1 second, 0.01 second). As shown by this example, some embodiments of a remote computing device or a sensor array combine groups of sensed data that were generated within a predetermined time interval into a single group of sensed data. Thus, in FIG. 4, the three groups of sensed data 190A-C are combined into a single group of sensed data 190D.

Accordingly, when groups of sensed data are obtained from multiple sensor arrays, the groups may be collected into a merged set (e.g., the combined set 191D in FIG. 3), and some of the groups may be combined with other groups (e.g., as illustrated in FIG. 4).

Figure 5:
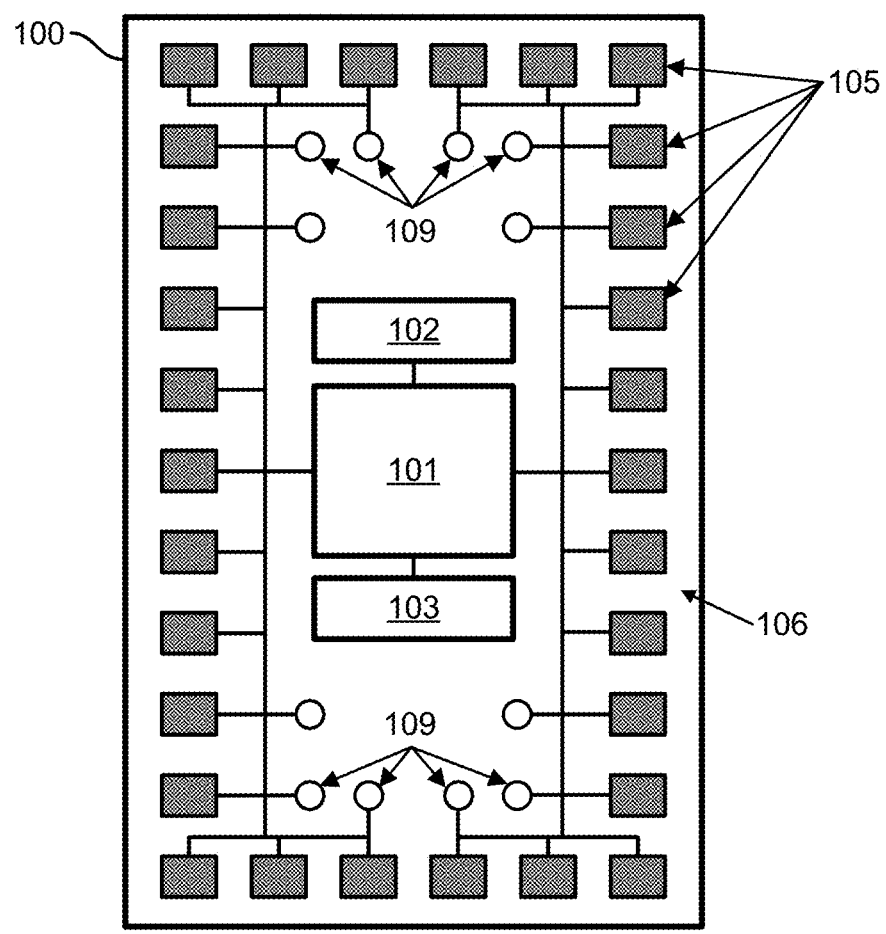
FIG. 5 illustrates an example embodiment of a sensor array.

FIG. 5 illustrates an example embodiment of a sensor array. The sensor array 100 includes a plurality of sensors 105, a system on a chip (SoC) 101, a transceiver 102, a wireless-power receiver 103, and a plurality of LEDs 109, which may emit different colors. For example, the LEDs 109 may emit different colors and patterns of lights to communicate information (e.g., status information, diagnostic information) to a user. The sensor array 100 may also include a base layer 106. The base layer 106 may be a flexible semiconductor substrate and may be the substrate of one or more of the other members of the sensor array 100. Also, the base layer 106 may be or may include paper or another medium (e.g., some plastics, some silicones) that has paper-like characteristics (e.g., flexibility), which may allow the medium to travel along a path in a manner that is similar to paper.

In some embodiments, one or more of the sensors 105 are implemented in a respective wireless identification and sensing platform (WISP). Thus, the sensor array 100 may include one or more WISPs. The SoC 101 includes at least one processor, memory (e.g., RAM, ROM) or other storage, and input or output ports. The transceiver 102 allows the SoC 101 to send data (e.g., sensed data) to, and receive data from, other devices, such as other sensor arrays. The transceiver 102 can use various protocols to send and receive data, for example Bluetooth Low Energy, Z-Wave, Zigbee, IEEE 802.11ah, and near-field communication (NFC). Also, some embodiments of the sensor array 100 can form an ad hoc network. In some embodiments where sensor arrays 100 implement an ad hoc network, if some, but not all, of the sensor arrays 100 can directly communicate with a particular sensor array 100, then the sensor arrays 100 that cannot directly communicate with the particular sensor array 100 can transmit sensed data to the particular sensor array 100 via the other sensor arrays 100 in the ad hoc network.

The wireless-power receiver 103, which may include a power-reception antenna, is configured to receive wireless power that can be used to supply power to the sensors 105, the SoC 101, and the transceiver 102. For example, the wireless-power receiver 103 may use resonant inductive coupling to receive energy. Additionally, in some embodiments (e.g., embodiments that use WISPs to implement the sensors 105), the sensors 105 may be configured to receive their own wireless power, and thus do not require the wireless-power receiver 103 to supply their power. And, in some embodiments, the transceiver 102 is combined with the wireless-power receiver 103. The combination of the transceiver 102 and the wireless-power receiver 103 can receive wireless power, receive data, and send data.

The sensors 105 may include various types of sensors, for example the following: temperature sensors, vibration sensors, pressure sensors, gyroscopes, color sensors, light sensors (e.g., visible light, infrared light), humidity sensors, chemical sensors, and voltage sensors.

In some embodiments, the sensors 105, the SoC 101, the transceiver 102, and the wireless-power receiver 103 are all flexible. The flexibility of the components of the sensor array 100 (including the sensors 105, the SoC 101, the transceiver 102, the wireless-power receiver 103, and any substrates) allows the components of the sensor array 100 to travel along a path that flexes or bends the sensor array 100 without being damaged. For example, in some embodiments, the sensors 105, the SoC 101, the transceiver 102, and the wireless-power receiver 103 are flex circuits. Also, the sensors 105, the SoC 101, the transceiver 102, and the wireless-power receiver 103 may all be formed on a single flexible substrate. And, in some embodiments, the sensors 105, the SoC 101, the transceiver 102, and the wireless-power receiver 103 are not all formed on the same substrate. For example, the SoC 101, the transceiver 102, and the wireless-power receiver 103 may be formed on one substrate, and the sensors 105 may be divided among multiple (e.g., 4, 5, 6, 7, 8) substrates.

Figure 6:
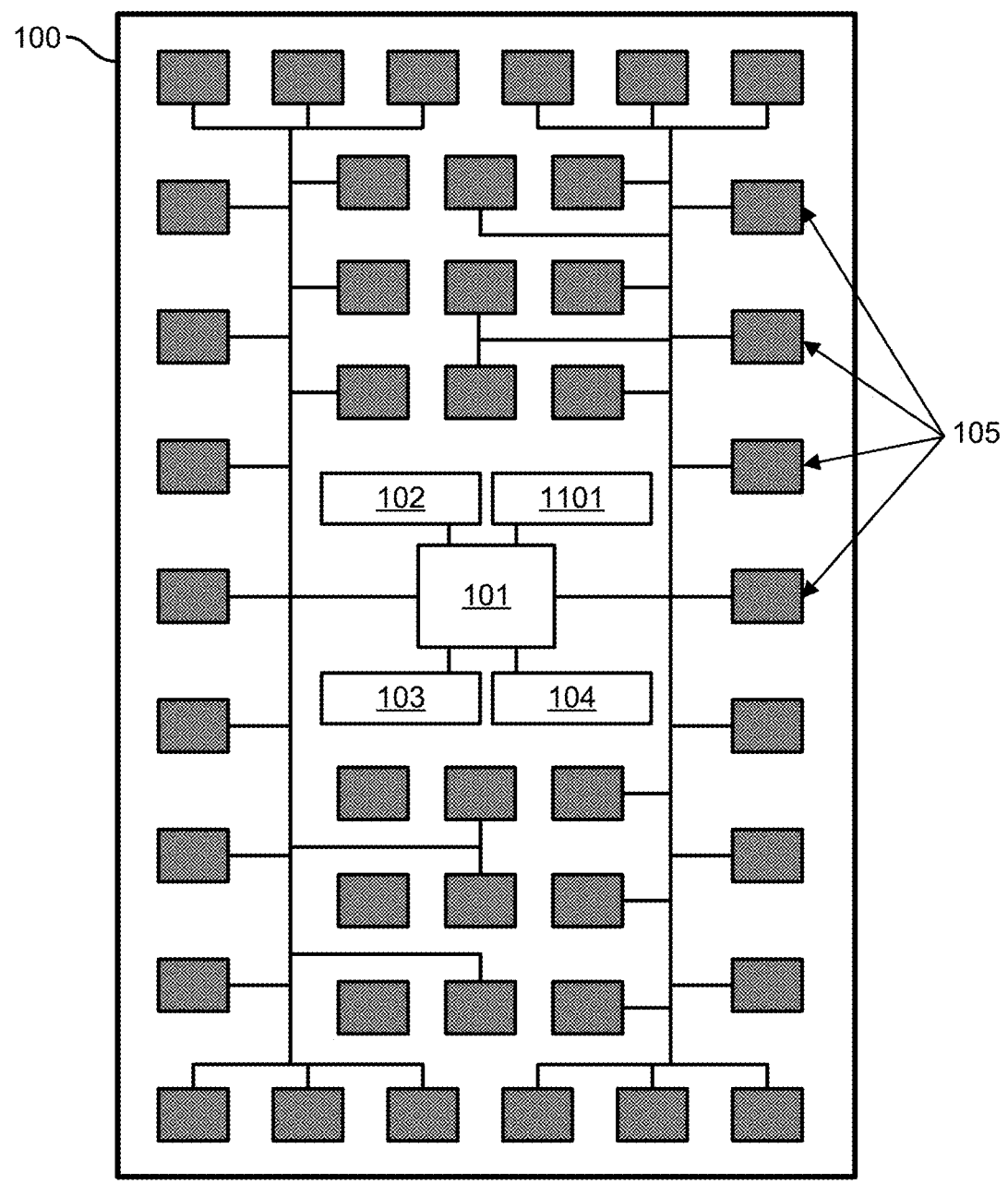
FIG. 6 illustrates an example embodiment of a sensor array.

FIG. 6 illustrates an example embodiment of a sensor array. The sensor array 100 includes sensors 105, a SoC 101, a transceiver 102, a wireless-power receiver 103, and an identification transmitter 104 (e.g., a radio-frequency-identification (RFID) tag). As indicated by the differences between the number and placement of the sensors 105 in FIGS. 5 and 6, various embodiments of the sensor array 100 can include different numbers of sensors 105, and the sensors 105 may be positioned in different arrangements. The number and placement of the sensors 105 may be configured for a specific application. Also, the number and placement of the sensors may depend on the sensing ranges of the sensors 105.

The identification transmitter 104 can transmit an identifier of the sensor array 100. This can allow other devices and systems to distinguish between different sensor arrays 100. Also, some embodiments of the sensor array 100 omit the wireless-power receiver 103 and wirelessly receive power through the identification transmitter 104. In embodiments that do not include an identification transmitter 104, other components (e.g., the SoC 101 and the transceiver) may be configured to transmit an identifier of the sensor array 100.

Furthermore, as shown in FIG. 6, the sensor array 100 may include a battery 1101, such as a rechargeable lithium battery. Thus, the sensor array 100 may be able to operate even when it does not receive wireless power. For example, the sensor array 100 may charge the battery 1101 with received wireless power, and, when the supply of wireless power is stopped, operate using power that is supplied from the battery 1101.

Additionally, in some embodiments, the sensors 105 each include a respective processor and memory, and the processor and memory can be implemented in a microcontroller. And some embodiments of the sensors 105 include other specialized integrated-circuit components (e.g., application-specific integrated circuits) that are specially-configured to perform certain tasks. For example, in some embodiments, the sensors 105 are microelectromechanical systems (MEMS), such as a Smartdust mote. And each of the sensors 105 may include a respective wireless-power receiver 113 or battery 1101. Thus, each sensor 105 may be configured to receive its own power, to store its own power, to store sensed data, and to transmit sensed data.

Also, the sensors 105 may be able to create and use an ad hoc network to communicate with each other. In some embodiments where the sensors 105 implement an ad hoc network, if some, but not all, of the sensors 105 can directly communicate with a transceiver or receiver that receives sensed data, then the sensors 105 that cannot directly communicate with the transceiver or receiver can transmit sensed data to the transceiver or receiver via the other sensors 105 in the ad hoc network.

Figure 7:
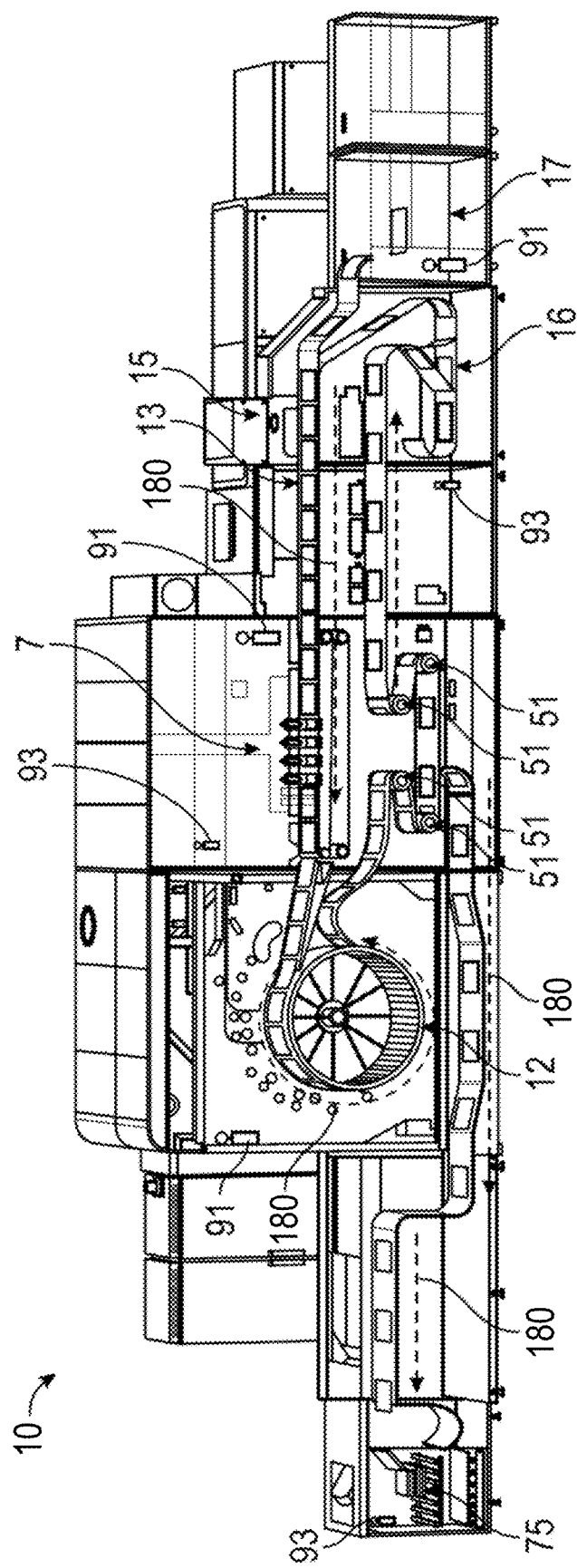
FIG. 7 illustrates an example embodiment of a path.

FIG. 7 illustrates an example embodiment of a path. In this embodiment, the path 180 is an image-forming path in an image-forming device 10. The image-forming device 10 includes one or more print heads 7 (e.g., inkjet print heads), a drying station 12, a transport belt 13, and inspection station 15, a duplex switch 16, a media repository 17, rollers 51, and a discharge portion 75. The drying station 12 dries the ink that has been applied to the media, and the drying station 12 may use multiple drying techniques. The transport belt 13 conveys media on the image-forming path 180. Also, the transport belt 13 may use vacuum suction to hold the media flat. The inspection station 15 inspects the media as they travel by, detects media that have imperfections, and discards media that have imperfections. The duplex switch 16 adjusts the image-forming path 180 to enable or disable duplex printing.

Additionally, this embodiment of the image-forming device 10 includes at least one wireless-power transmitter 91. The wireless-power transmitter 91 is configured to wirelessly supply power to one or more sensor arrays 100, which may, for example, receive the power via a wireless-power receiver or an RFID tag. The wireless-power transmitter 91 may be positioned to allow the wireless-power transmitter 91 to more efficiently supply power to the sensor arrays 100, for example near the path 180 (the image-forming path). Also, while the sensor arrays 100 travel along the path 180, the wireless-power transmitter 91 may continuously or intermittently supply power to the sensor arrays 100.

And this embodiment of the image-forming device 10 includes at least one transceiver 93 (or receiver). The transceiver 93 receives data (e.g., sensed data) from the sensor arrays 100. In some embodiments, the transceiver 93 continually or continuously receives data from a sensor array 100 while the sensor array 100 travels along the image-forming path 180. And, in some embodiments, the transceiver 93 receives data from a sensor array 100 only after the sensor array 100 has finished traveling the path 180.

Figure 8:
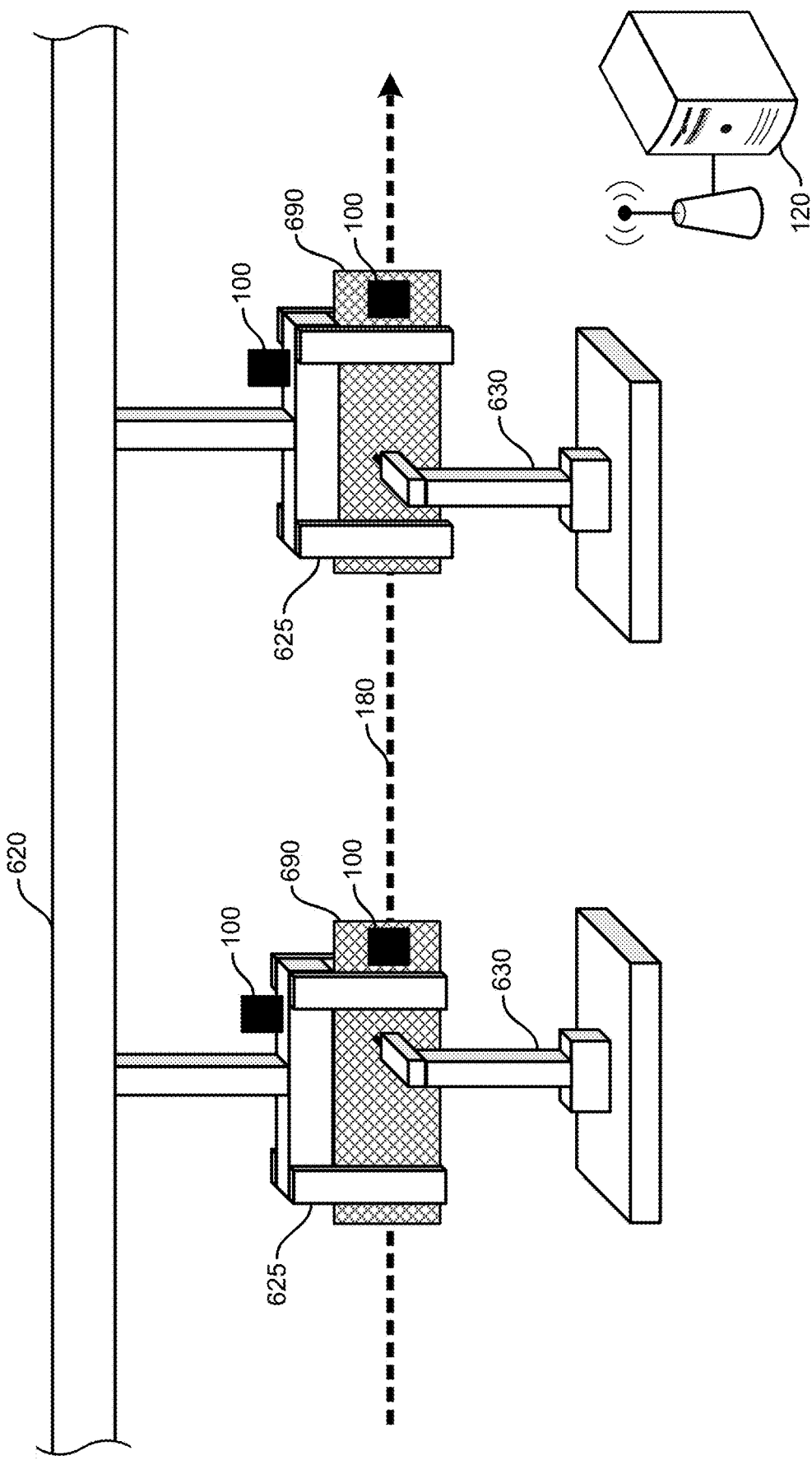
FIG. 8 illustrates an example embodiment of a path.

FIG. 8 illustrates an example embodiment of a path. In this embodiment, the path 180 travels along an assembly line 620. The assembly line 620 include carriers 625 (e.g., mounts), which carry manufactured articles 690 (e.g., automobiles, engines, appliances, electronic devices, furniture) along the assembly line. In this embodiment, industrial robots 630 perform manufacturing operations (e.g., welding, fastening, assembly, painting, disassembly, testing) on the articles 690. Sensor arrays 100 may be attached to the carriers 625 or the articles 690. And the sensor arrays 100 may wirelessly communicate with one or more computing devices 120.

Figure 9:
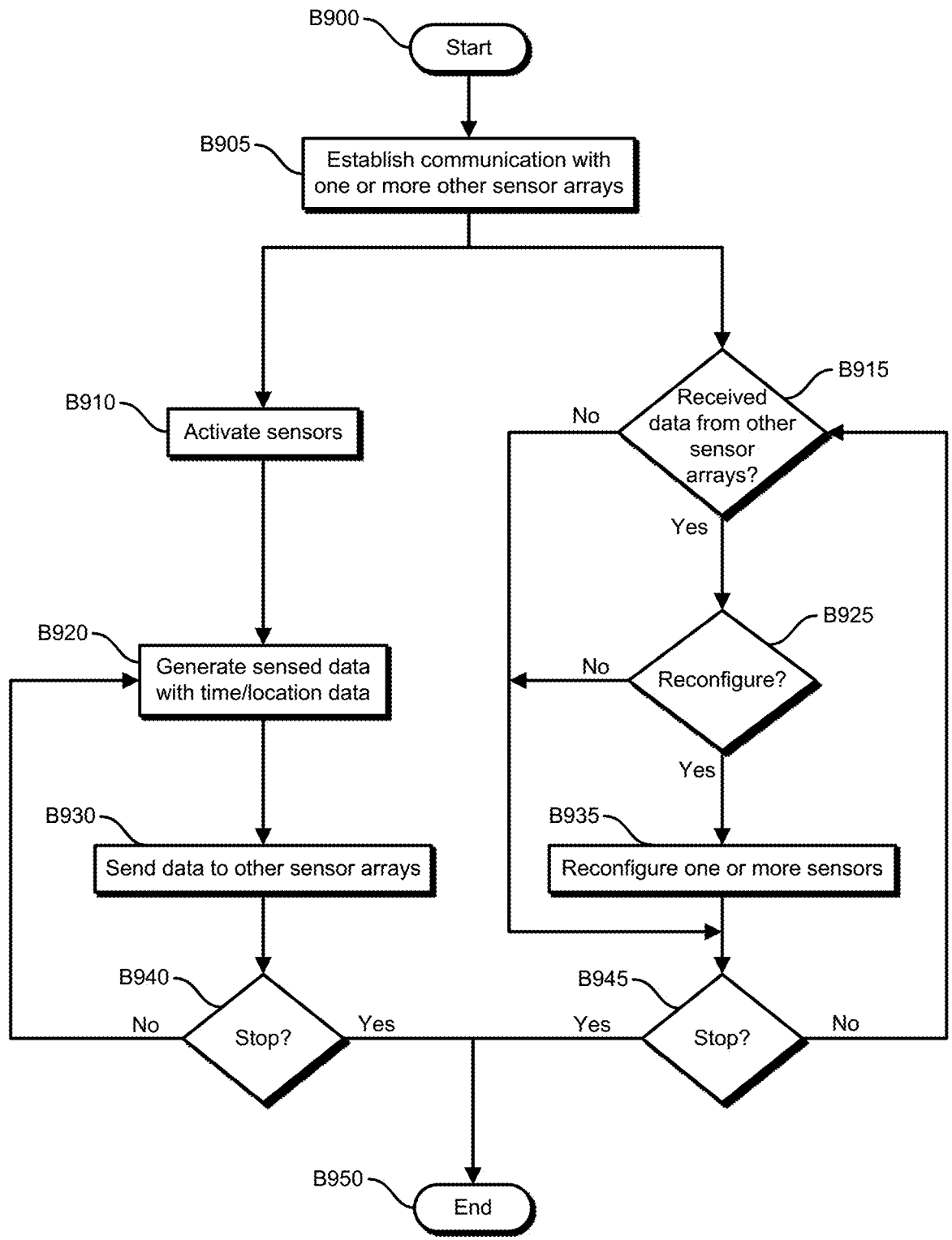
FIG. 9 illustrates an example embodiment of an operational flow for obtaining sensor measurements.

FIG. 9 illustrates an example embodiment of an operational flow for obtaining sensor measurements. Although this operational flow and the other operational flows that are described herein are each presented in a certain respective order, some embodiments of these operational flows perform at least some of the operations in different orders than the presented orders. Examples of different orders include concurrent, parallel, overlapping, reordered, simultaneous, incremental, interleaved, synchronous, and asynchronous orders. Also, some embodiments of these operational flows include operations (e.g., blocks) from more than one of the operational flows that are described herein. Thus, some embodiments of the operational flows may omit blocks, add blocks (e.g., include blocks from other operational flows that are described herein), change the order of the blocks, combine blocks, or divide blocks into more blocks relative to the example embodiments of the operational flows that are described herein.

The flow starts in block B900 and then moves to block B905, where a sensor array establishes communication with one or more other sensor arrays. The communication may be direct, or the communication may be indirect (via one or more intermediary sensor arrays). The flow then splits into a first flow and a second flow, at least some of which may be simultaneously executed.

The first flow moves to block B910, where the sensor array activates one or more sensors. Next, in block B920, the sensors of the sensor array generate sensed data with time data or with location data. Time data indicate when the sensed data were generated, and location data indicate where the sensed data were generated. Also, in some embodiments the sensor array generates location data based on time data. For example, the sensor array may calculate the location where sensed data was generated based on the speed (or speeds) of the sensor array's travel along the path and the time for which the sensor array has been traveling. The sensor array may store some or all of the sensed data, the time data, or the location data. The first flow then moves to block B930, where the sensor array sends some or all of the sensed data, the time data, or the location data to one or more other sensor arrays. Then, in block B940, the sensor array determines whether to stop sensing (e.g., in response to a stop instruction, in response to reaching an end of the path). If the sensor array determines not to stop sensing (B940=No), then the first flow returns to block B920. If the sensor array determines to stop sensing (B940=Yes), then the first flow ends in block B950.

From block B905, the second flow advances to block B915. In block B915, the sensor array determines whether it has received data from any other sensor arrays. If the sensor array determines that it has not received data from any other sensor arrays (B915=No), then the second flow moves to block B945. If the sensor array determines that it has received data from one or more other sensor arrays (B915=Yes), then the second flow proceeds to block B925.

In block B925, the sensor array determines whether to reconfigure one or more of its sensors based on at least some of the received data. For example, the sensor array may determine to reconfigure one or more of its sensors if the received data include sensed data that include one or more measurements that exceed respective thresholds, if the received data include sensed data that include one or more measurements that fall within respective ranges, or if the received data indicate that one or more anomalies (e.g., one or more anomaly signatures) were detected.

If the sensor array determines not to reconfigure one or more of its sensors (B925=No), then the second flow moves to block B945. If the sensor array determines to reconfigure one or more of its sensors (B925=Yes), then the second flow advances to block B935. In block B935, the sensor array reconfigures one or more sensors. For example, the sensor array may reconfigure a sensor by changing one of the following settings: changing (e.g., increasing, decreasing) a sampling rate, changing a sensing direction of a directional sensor, changing the sensitivity of a sensor, changing the gain of a sensor, changing the phase of a sensor, changing the frequency of a sensor, changing the sensing range of a sensor, changing the full scale of a sensor, changing a de-aliasing process that is used on the sensed data of a sensor, changing a filter (e.g., high pass, low pass, band pass) of a sensor, and changing a calibration of a sensor.

The second flow then moves to block B945. In block B945, the sensor array determines whether to stop sensing (e.g., in response to a stop instruction, in response to reaching an end of the path). If the sensor array determines not to stop sensing (B945=No), then the second flow returns to block B915. Also, in some embodiments, the sensor array again reconfigures the one or more sensors (e.g., returns the configurations to a default setting) if a condition is satisfied. Examples of the condition include the absence of any detected anomaly (no anomaly is detected), the passage of a predefined length of time, the traveling of a predefined distance by the sensor array, and the passing of (or arrival at) a predefined location by the sensor array. If the sensor array determines to stop sensing (B945=Yes), then the second flow ends in block B950.

Figure 10:
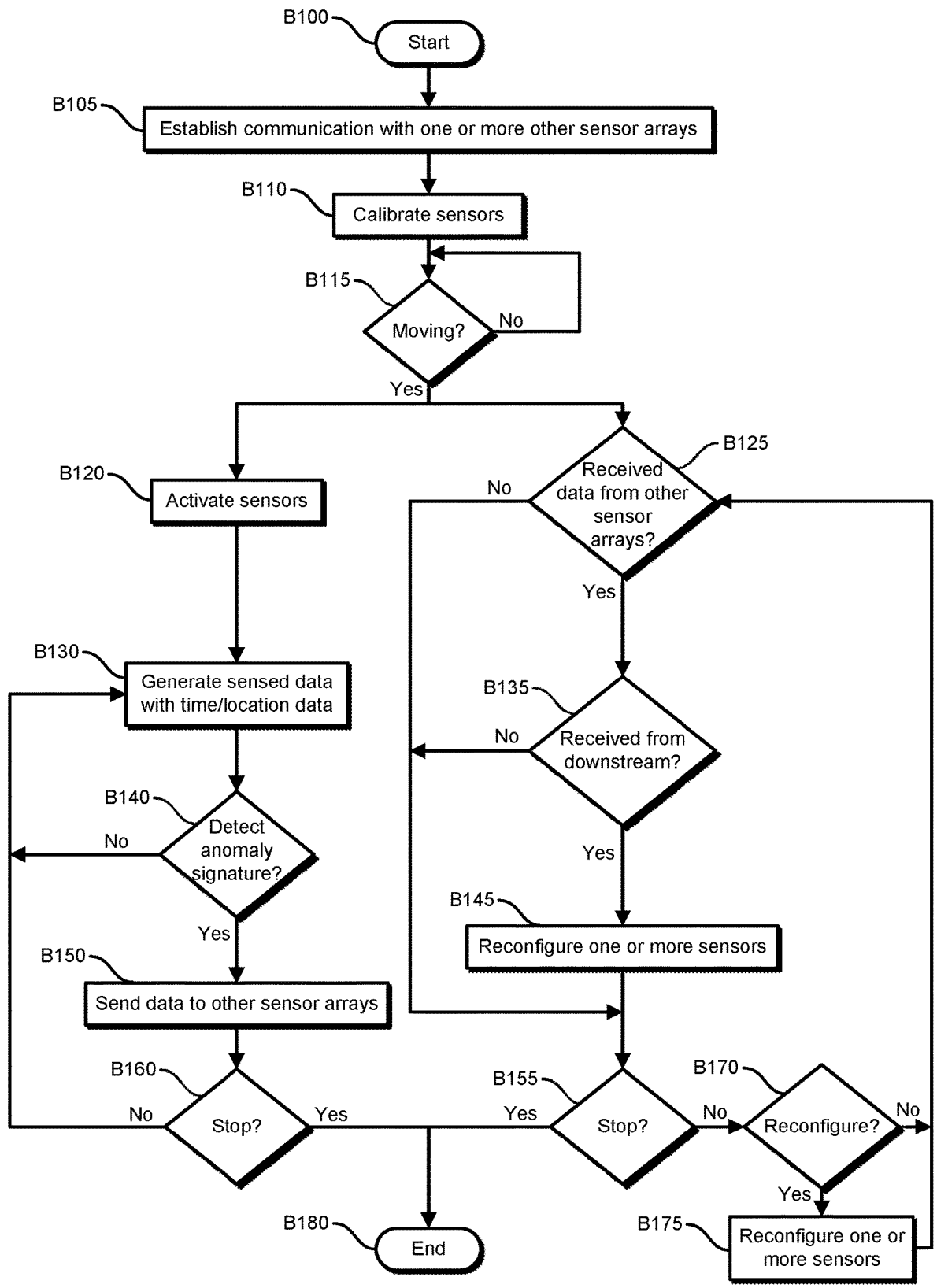
FIG. 10 illustrates an example embodiment of an operational flow for obtaining sensor measurements.

FIG. 10 illustrates an example embodiment of an operational flow for obtaining sensor measurements. The flow starts in block B1000 and proceeds to block B1005, where a sensor array establishes communication with one or more other sensor arrays. Next, in block B1010, the sensor array calibrates its sensors. The flow then advances to block B1015, where the sensor array determines whether it is moving. If the sensor array determines that it is not moving (B1015=No), then the flow returns to block B1015. If the sensor array determines that it is moving (B1015=Yes), then the flow splits into a first flow and a second flow.

The first flow moves to block B1020, where the sensor array activates its sensors, which then begin to generate sensed data. Next, in block B1040, the sensor array determines whether it has detected at least part of an anomaly signature based on the sensed data. For example, the sensor array may include a neural network that has been trained to detect one or more anomaly signatures based on sensed data. Also for example, the sensor array may determine that at least part of an anomaly signature has been detected if the sensed data include measurements that fall outside of a range (e.g., if a measurement exceeds a threshold, if a measurement falls short of a threshold). Furthermore, in some embodiments, an anomaly signature includes groups of sensed data that were generated within a predetermined window of time of an anomaly.

Figure 11:
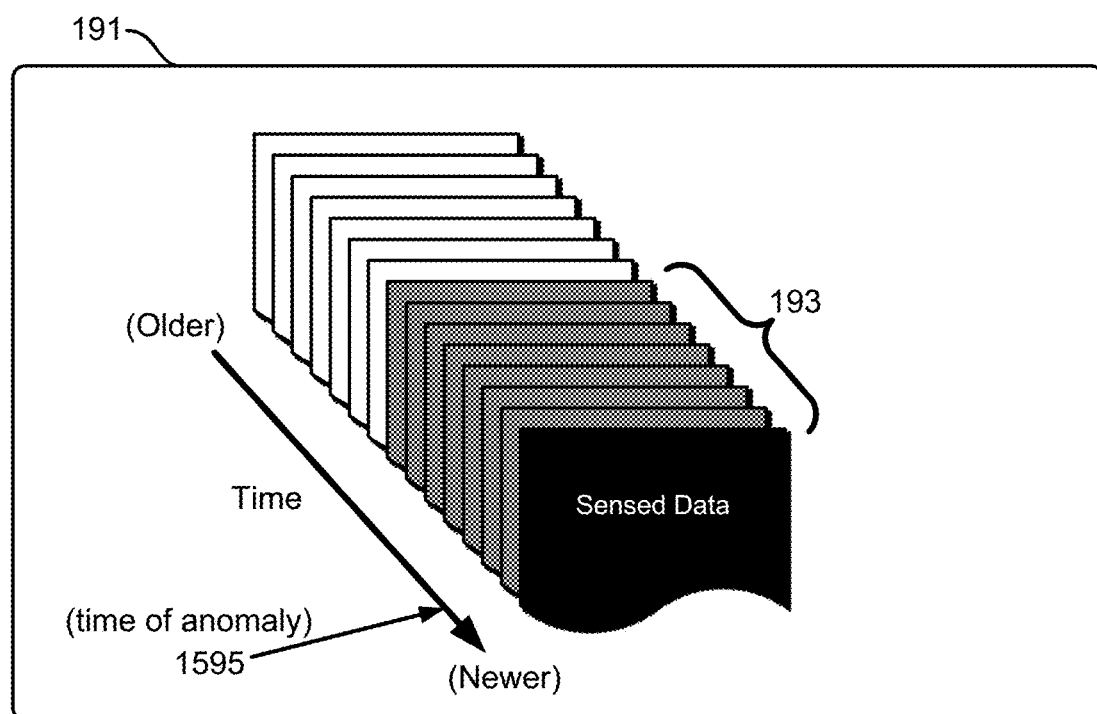
FIG. 11 illustrates an example embodiment of an anomaly signature.

For example, FIG. 11 illustrates an example embodiment of an anomaly signature. FIG. 11 includes a set 191 of groups of sensed data. The groups in the set 191 are sorted according to time. Also, an anomaly (e.g., component failure, component malfunction) was detected at a time 1595. For example, a device may generate an error code at time 1595. Thus, during a training phase of the anomaly signature 193, the groups of sensed data that were generated within a threshold amount of time of the anomaly time 1595 are added to the anomaly signature 193. For example, some embodiments of the anomaly signature 193 include 100 groups, some include 1,000 groups, and some include 10,000 groups. Also, the groups of sensed data in the anomaly signature 193 may be used as negative examples when training a machine-learning model (e.g., a neural network). And groups of sensed data that are not in an anomaly signature may be used a positive examples when training a machine-learning model. To determine whether a part of an anomaly signature is detected, some embodiments of a sensor array compare the sensed data that are generated in block B1030 with the groups of sensed data in the anomaly signature 193 and determine if they are sufficiently similar (e.g., within one or more thresholds). For example, a sensor array may compare a group of sensed data that was generated in block B1030 with each of the groups of sensed data in the anomaly signature 193 and determine if the group of sensed data that was generated in block B1030 is sufficiently similar to one or more of the groups of sensed data in the anomaly signature 193.

If the sensor array does not determine that it has detected at least part of an anomaly signature (B1040=No), then the flow returns to block B1030. If the sensor array does determine that it has detected at least part of an anomaly signature (B1040=Yes), then the flow advances to block B1050. In block B1050, the sensor array sends data to other sensor arrays. The data may include at least some sensed data (e.g., sensed data that was detected as being part of an anomaly signature) or may include an identifier of the anomaly (e.g., an error code).

Then, in block B1060, the sensor array determines whether to stop sensing. If the sensor array determines not to stop sensing (B1060=No), then the first flow returns to block B1030. If the sensor array determines to stop sensing (B1060=Yes), then the first flow ends in block B1080.

From block B1015, the second flow advances to block B1025. In block B1025, the sensor array determines whether it has received data from any other sensor arrays. If the sensor array determines that it has not received data from any other sensor arrays (B1025=No), then the second flow moves to block B1055. If the sensor array determines that it has received data from one or more other sensor arrays (B1025=Yes), then the second flow proceeds to block B1035.

In block B1035, the sensor array determines whether the received data was generated by a sensor array that is downstream on the path. If the sensor array determines that the received data was not generated by a sensor array that is downstream on the path (B1035=No), then the second flow moves to block B1055. If the sensor array determines that the received data was generated by a sensor array that is downstream on the path (B1035=Yes), then the second flow proceeds to block B1045.

In block B1045, the sensor array reconfigures one or more sensors. In this embodiment, because the sensor arrays send data only if they detect at least part of an anomaly signature, the received data indicate one or more anomalies. Thus, the sensor array may reconfigure its sensors to detect the anomalies that are indicated by received data that was generated by a downstream sensor array.

The second flow then moves to block B1055. In block B1055, the sensor array determines whether to stop sensing (e.g., in response to a stop instruction, in response to reaching an end of the path). If the sensor array determines not to stop sensing (B1055=No), then the second flow proceeds to block B1070. If the sensor array determines to stop sensing (B1055=Yes), then the second flow ends in block B1080.

In block B1070, the sensor array determines whether to reconfigure any of the one or more sensors based on whether a condition has been satisfied. Examples of the condition include the passage of a predefined length of time since the sensors were reconfigured in block B1045, the traveling of a predefined distance by the sensor array since the sensors were reconfigured in block B1045, and the passing of (or arrival at) a predefined location by the sensor array. If the sensor array determines not to reconfigure any of the one or more sensors (B1070=No), then the second flow returns to block B1025. If the sensor array determines to configure any of the one or more sensors, then the second flow moves to block B1075. In block B1075, the sensor array reconfigures one or more sensors. For example, in some embodiments, the sensor array returns the configurations of one or more sensors to default settings or initial settings. The second flow then returns to block B1025.

Thus, in block B1045, the sensor array may reconfigure one or more sensors from default settings to settings that consume more power (e.g., by increasing a sampling rate). Then, in block B1075, the sensor array may return the configurations of the sensors to the default settings. Accordingly, the sensor array may use sensor settings that consume more power when the sensor array has received data that indicate that an anomaly may be present, and then the sensor array can return to sensor settings that use less power after a condition has been satisfied.

Figure 12:
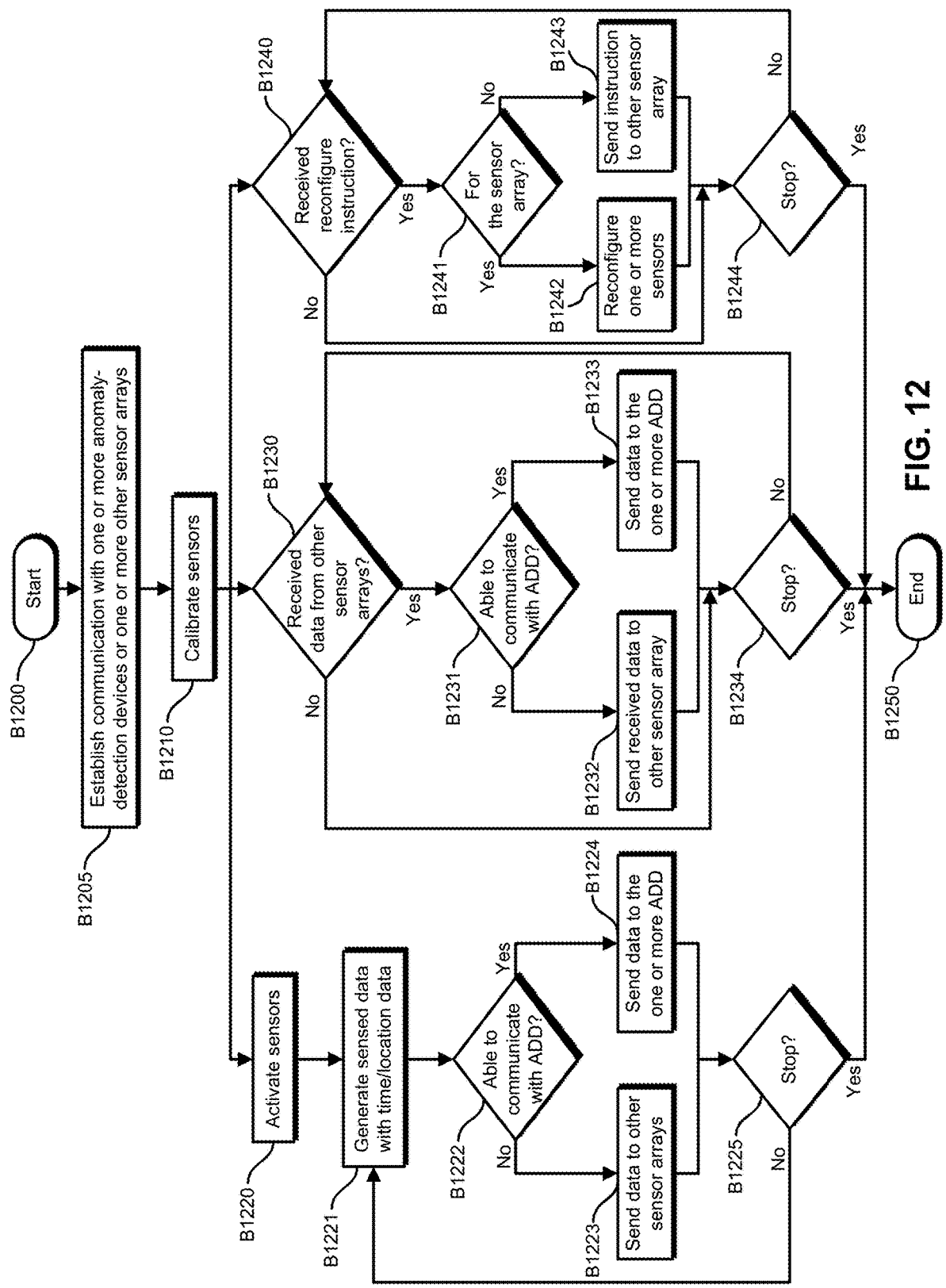
FIG. 12 illustrates an example embodiment of an operational flow for obtaining sensor measurements.

FIG. 12 illustrates an example embodiment of an operational flow for obtaining sensor measurements. The flow starts in block B1200 and then moves to block B1205, where a sensor array establishes communication with one or more anomaly-detection devices or with one or more other sensor arrays. Next, in block B1210, the sensor array calibrates its sensors. The flow then splits into a first flow, a second flow, and a third flow.

The first flow moves to block B1220, where the sensor array activates its sensors. Then, in block B1221, the sensor array generated sensed data with time data or with location data. The first flow then advances to block B1222, where the sensor array determines whether it is able to directly communicate (communicate without communicating via any intermediary devices) with the one or more anomaly-detection devices (ADD). If the sensor array determines that it is not able to directly communicate with the one or more anomaly-detection devices (B1222=No), then the first flow moves to block B1223. In block B1223, the sensor array sends some or all of the sensed data to one or more other sensor arrays (which then attempt to relay the sensed data to the one or more anomaly-detection devices). The first flow then proceeds to block B1225. If the sensor array determines that it is able to directly communicate with the one or more anomaly-detection devices (B1222=Yes), then the first flow moves to block B1224. In block B1224, the sensor array sends some or all of the sensed data to the one or more anomaly-detection devices, and then the first flow proceeds to block B1225.

In block B1225, the sensor array determines whether to stop sensing. If the sensor array determines not to stop sensing (B1225=No), then the first flow returns to block B1221. If the sensor array determines to stop sensing (B1225=Yes), then the first flow ends in block B1250.

From block B1210, the second flow advances to block B1230. In block B1230, the sensor array determines whether it has received data from any other sensor arrays. If the sensor array determines that it has not received data from any other sensor arrays (B1230=No), then the second flow moves to block B1234. If the sensor array determines that it has received data from one or more other sensor arrays (B1230=Yes), then the second flow proceeds to block B1231.

In block B1231, the sensor array determines whether it is able to directly communicate with an anomaly-detection device (ADD). If the sensor array determines that it is not able to directly communicate with an anomaly-detection device (B1231=No), then the second flow proceeds to block B1232, where the sensor array sends the received data to another sensor array (which is also a different sensor array than the sensor array from which the data were received). And then, from block B1232, the second flow moves to block B1234. If the sensor array determines that it is able to directly communicate with one or more anomaly-detection devices (B1231=Yes), then the second flow proceeds to block B1233, where the sensor array sends the received data to the one or more anomaly-detection devices. The second flow then moves to block B1234.

In block B1234, the sensor array determines whether to stop the second flow. If the sensor array determines not to stop the second flow (B1234=No), then the second flow returns to block B1230. If the sensor array determines to stop the second flow (B1234=Yes), then the second flow ends in block B1250.

From block B1210, the third flow advances to block B1240. In block B1240, the sensor array determines whether it has received a reconfigure instruction that includes one or more settings from an anomaly-detection device. If the sensor array determines that it has not received a reconfigure instruction (B1240=No), then the third flow proceeds to block B1244. If the sensor array determines that it has received a reconfigure instruction (B1240=Yes), then the third flow proceeds to block B1241.

In block B1241, the sensor array determines whether the received reconfigure instruction is for the sensor array (e.g., as indicated by an identifier in the reconfigure instruction). If the sensor array determines that the received reconfigure instruction is for the sensor array (B1241=Yes), then, in block B1242, the sensor array reconfigures one or more of its sensors according to the settings that are included in the reconfigure instruction. The flow then moves to block B1244. If the sensor array determines that the received reconfigure instruction is not for the sensor array (i.e., is for another sensor array) (B1241=No), then, in block B1243, the sensor array sends the reconfigure instruction to another sensor array. The sensor array may first attempt to send the reconfigure instruction to a sensor array this is identified by the reconfigure instruction and, if that fails, then send the reconfigure instruction to another sensor array (other than a sensor array from which it received the reconfigure instruction) that it can communicate with. After block B1243, the third flow advances to block B1244.

In block B1244, the sensor array determines whether to stop the third flow. If the sensor array determines not to stop the third flow (B1244=No), then the third flow returns to block B1240. If the sensor array determines to stop the third flow (B1244=Yes), then the third flow ends in block B1250.

Figure 13:
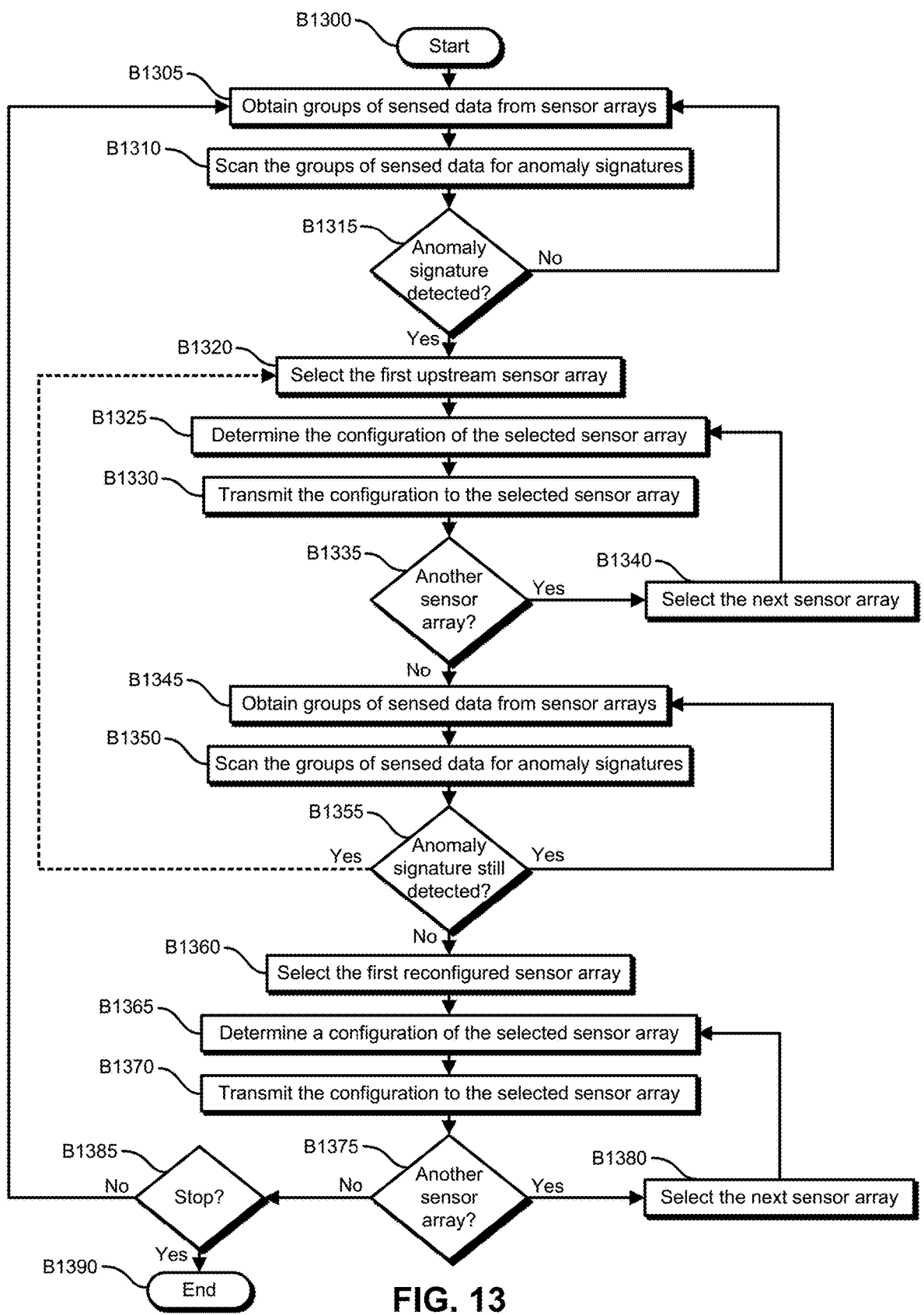
FIG. 13 illustrates an example embodiment of an operational flow for reconfiguring sensors.

FIG. 13 illustrates an example embodiment of an operational flow for reconfiguring sensors. Although this embodiment of the operational flow is performed by an anomaly-detection device, some embodiments of this operational flow are performed by two or more anomaly-detection devices or by one or more other specially-configured computing devices.

The flow starts in block B1300 and moves to block B1305, where an anomaly-detection device obtains groups of sensed data from one or more sensor arrays. Next, in block B1310, the anomaly-detection device scans the groups of sensed data for part or all of any anomaly signatures. Then, in block B1315, the anomaly-detection device determines whether part or all of any anomaly signatures were detected in block B1310. If no part of any anomaly signature was detected (B1315=No), then the flow returns to block B1305. If part or all of one or more anomaly signatures was detected (B1315=Yes), then the flow proceeds to block B1320.

In block B1320, based on the signature location, which is the location of the sensed data in which the one or more anomaly signatures were detected, the anomaly-detection device selects the first upstream sensor array, which is a sensor array that is upstream of the signature location. The signature location may be the location of the sensor array that generated the sensed data that included the anomaly signature. The first upstream sensor array may be the sensor array that, on the upstream path, is closest to the signature location.

Then, in block B1325, the anomaly-detection device determines the new configuration of the selected sensor array. For example, the anomaly-detection device may generate new settings for one or more sensors of the selected sensor array. The flow then moves to block B1330, where the anomaly-detection device transmits the new configuration to the selected sensor array. For example, if the anomaly-detection device can directly communicate with the selected sensor array, then the anomaly-detection device may directly transmit the new configuration to the selected sensor array. And, if the anomaly-detection device cannot communicate directly with the selected sensor array, then the anomaly-detection device may transmit the new configuration to the selected sensor array via or more intermediary sensor arrays.

Next, in block B1335, the anomaly-detection device determines whether to generate a new configuration for another sensor array. For example, the anomaly-detection device may determine to generate a new configuration for another sensor array if there is another sensor array on the path that is upstream of the signature location. If the anomaly-detection device determines to generate a new configuration for another sensor array (B1335=Yes), then the flow proceeds to block B1340, where the anomaly-detection device selects the next sensor array, and then the flow returns to block B1325. If the anomaly-detection device determines not to generate a new configuration for another sensor array (B1335=No), then the flow moves to block B1345.

In block B1345, the anomaly-detection device obtains groups of sensed data, at least some of which were generated by one or more reconfigured sensor arrays. The flow then advances to block B1350, where the anomaly-detection device scans the groups of sensed data that were received in block B1345 for part or all of one or more anomaly signatures. In some embodiments, the anomaly-detection device scans only for part or all of the anomaly signatures that were detected in block B1315. And, in some embodiments, the anomaly-detection device scans for part or all of any anomaly signatures.

Next, in block B1350, the anomaly-detection device determines whether part or all of an anomaly signature is still detected. If the anomaly-detection device determines that part or all of an anomaly signature is still detected (B1355=Yes), then the flow returns to block B1345. Also, in some embodiments, the flow instead returns to block B1320. Thus, in some embodiments, the anomaly-detection device continues to update the configuration of one or more sensor arrays while part or all of an anomaly signature is detected.

If the anomaly-detection device determines that part or all of an anomaly signature is not still detected (B1355=No), then the flow moves to block B1360. In block B1360, the anomaly-detection device selects the first reconfigured sensor array (even if the first reconfigured sensor array is no longer upstream of the signature location). However, some embodiments of the anomaly-detection device select the first sensor array that is upstream of the signature location. Next, in block B1365, the anomaly-detection device determines the configuration of the selected sensor array. The determined configuration may be a default configuration, and the determined configuration may be a configuration that is based on groups of sensed data. Then, in block B1370, the anomaly-detection device transmits the configuration to the selected sensor array (either directly or via one or more intermediary sensor arrays). Also, some embodiments replace the operations in blocks B1360-B1370 with a broadcast that instructs all sensor arrays to return to a previous (e.g., default) configuration.

The flow then advances to block B1375, where the anomaly-detection device determines whether to generate a configuration for another sensor array. For example, the anomaly-detection device may determine to generate a configuration for another sensor array if there is another sensor array on the path that has not been reconfigured since being reconfigured in blocks B1325-B1330. If the anomaly-detection device determines to generate a configuration for another sensor array (B1375=Yes), then the flow proceeds to block B1380, where the anomaly-detection device selects the next sensor array, and then the flow returns to block B1365. If the anomaly-detection device determines not to generate a configuration for another sensor array (B1375=No), then the flow moves to block B1385.

In block B1385, the anomaly-detection device determines whether to stop the operational flow. If the anomaly-detection device determines not to stop the operational flow (B1385=No), then the flow returns to block B1305. If the anomaly-detection device determines to stop the operational flow (B1385=Yes), then the flow ends in block B1390.

Figure 14:
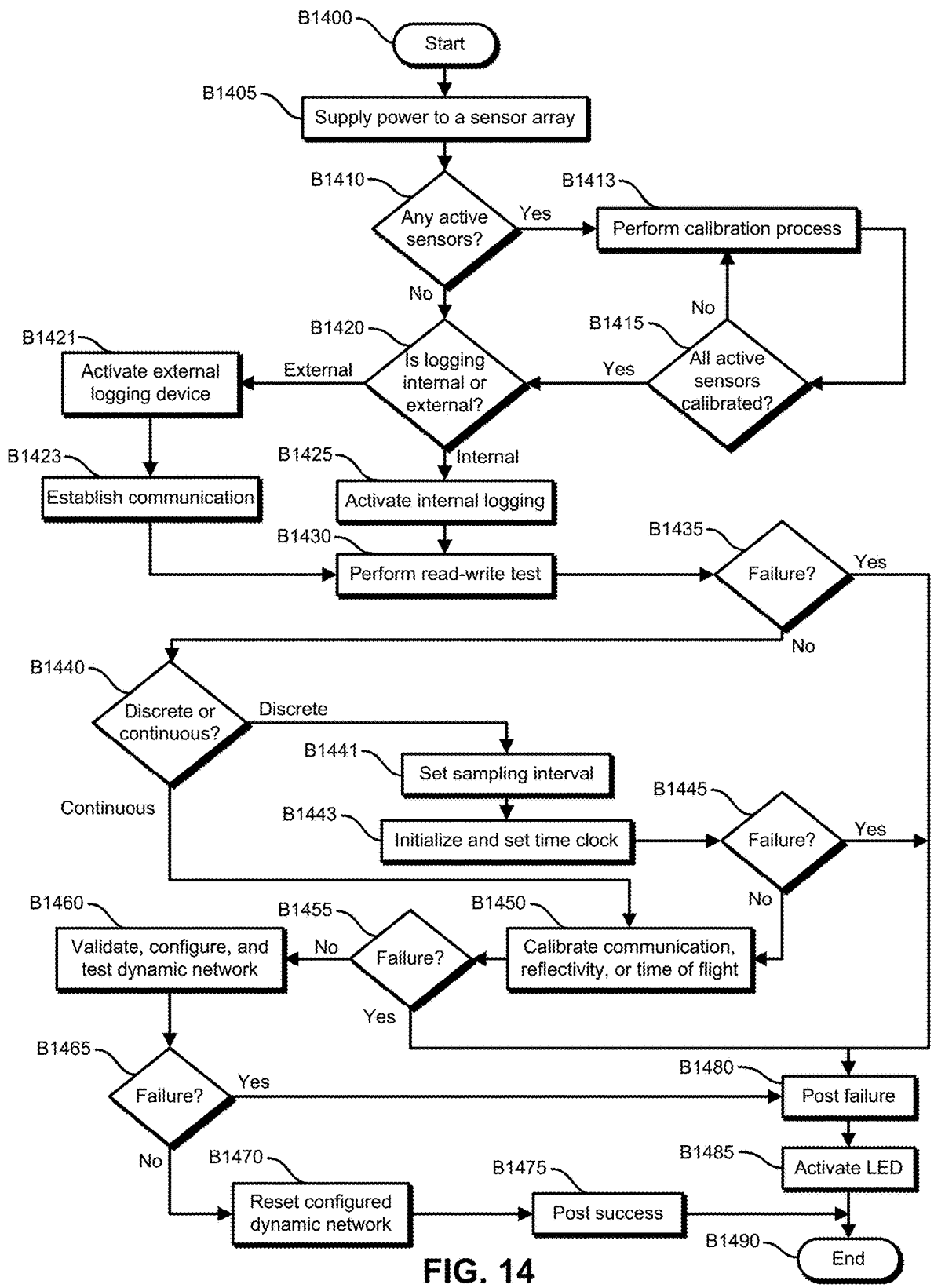
FIG. 14 illustrates an example embodiment of an operational flow for initializing sensors on a sensor array.

FIG. 14 illustrates an example embodiment of an operational flow for initializing sensors on a sensor array. The flow starts in block B1400 and then moves to B1405, where a power supply wirelessly supplies power to a sensor array. Embodiments of a sensor array that include a battery may draw power from the battery. Next, in block B1410, the sensor array determines if any of the sensors are active sensors (instead of passive sensors). For example, some acceleration sensors and gyroscopic sensors are active sensors. If some of the sensors are active sensors (B1410=Yes), then the flow moves to block B1413, where the sensor array performs a calibration process for the active sensors. The flow then moves to block B1415, where the sensor array determines whether all active sensors have been calibrated. If some of the active sensors have not been calibrated (B1415=No), then the flow returns to block B1413. If all of the active sensors have been calibrated (B1415=Yes), then the flow moves to block B1420.

Also, if in block B1410 none of the sensors are active sensors (B1410=No), then the flow moves to block B1420.

In block B1420, the sensor array determines whether the data logging is internal or external. If the data logging is external (B1420=External), then the flow moves to block B1421. For example, the data logging is external if an anomaly-detection device or a sensor-communication device logs the sensor data. If the data logging is internal (B1420=Internal), then the flow proceeds to block B1425.

In block B1421, the external logging device (e.g., an anomaly-detection device, a sensor-communication device) is activated (if it is not already activated). Then, in block B1423, the sensor array establishes communication with the external logging device, and the flow then moves to block B1430.

In block B1425, the sensor array activates its internal logging, and the flow then advances to block B1430.

In block B1430, the sensor array causes the logging device (either internal or external) to perform a read-write test. Next, in block B1435, the sensor array determines whether the read-write test failed. If the test did not fail (B1435=No), then the flow proceeds to block B1440. If the test did fail (B1435=Yes), then the flow moves to block B1480.

In block B1440, the sensor array determines whether the sensor data is generated discretely or continuously. If it is generated discretely (B1440=Discrete), then the flow moves to block B1441. If it is generated continuously (B1440=Continuous), then the flow advances to block B1450.

In block B1441, the sensor array sets the sampling interval (or sampling rate). For example, the sampling interval may be the same for all sensors, some sensors may have the same interval and some sensors may have different intervals, or all of the sensors may have different intervals. Then, in block B1443, the sensor array initializes and sets (e.g., synchronizes) a time clock. Next, in block B1445, the sensor array determines whether the operations in blocks B1441 and B1443 failed. If they did not fail (B1445=No), then the flow proceeds to block B1450. If they did fail (B1445=Yes), then the flow moves to block B1480.

In block B1450, the sensor array calibrates the communication (e.g., omnidirectional communication) between the sensors; calibrates the sensors to account (e.g., compensate) for reflectivity, diffraction, and scattering; and calibrates the time of flight for any sensors whose reading are affected by time of flight. The flow then advances to block B1455, where the sensor array determines whether the operations in block B1450 failed. If they did not fail (B1450=No), then the flow proceeds to block B1460. If they did fail (B1450=Yes), then the flow moves to block B1480.

In block B1460, the sensor array validates, configures, and tests a dynamic network (e.g., an ad hoc network) with other sensor arrays. This may include configuring or reconfiguring the dynamic network. Also, this may include establishing communication with one or more anomaly-detection devices. The flow then advances to block B1465, where the sensor array determines whether the operations in block B1460 failed. If they did not fail (B1465=No), then the flow proceeds to block B1470. If they did fail (B1465=Yes), then the flow moves to block B1480.

In block B1470, the sensor array resets the configured dynamic network. Then, in block B1475, the sensor array posts a success message (e.g., to an anomaly-detection device, to a sensor-communication device), and the flow ends in block B1490.

In block B1480, the sensor array posts a failure message (e.g., to an anomaly-detection device, to a sensor-communication device). Then, in block B1485, the sensor array activates one of more LEDs of the sensor array. The color or light-emitting pattern of the one or more LEDs may indicate the cause of the failure that was posted in B1480. The flow then ends in block B1490.

Figure 15:
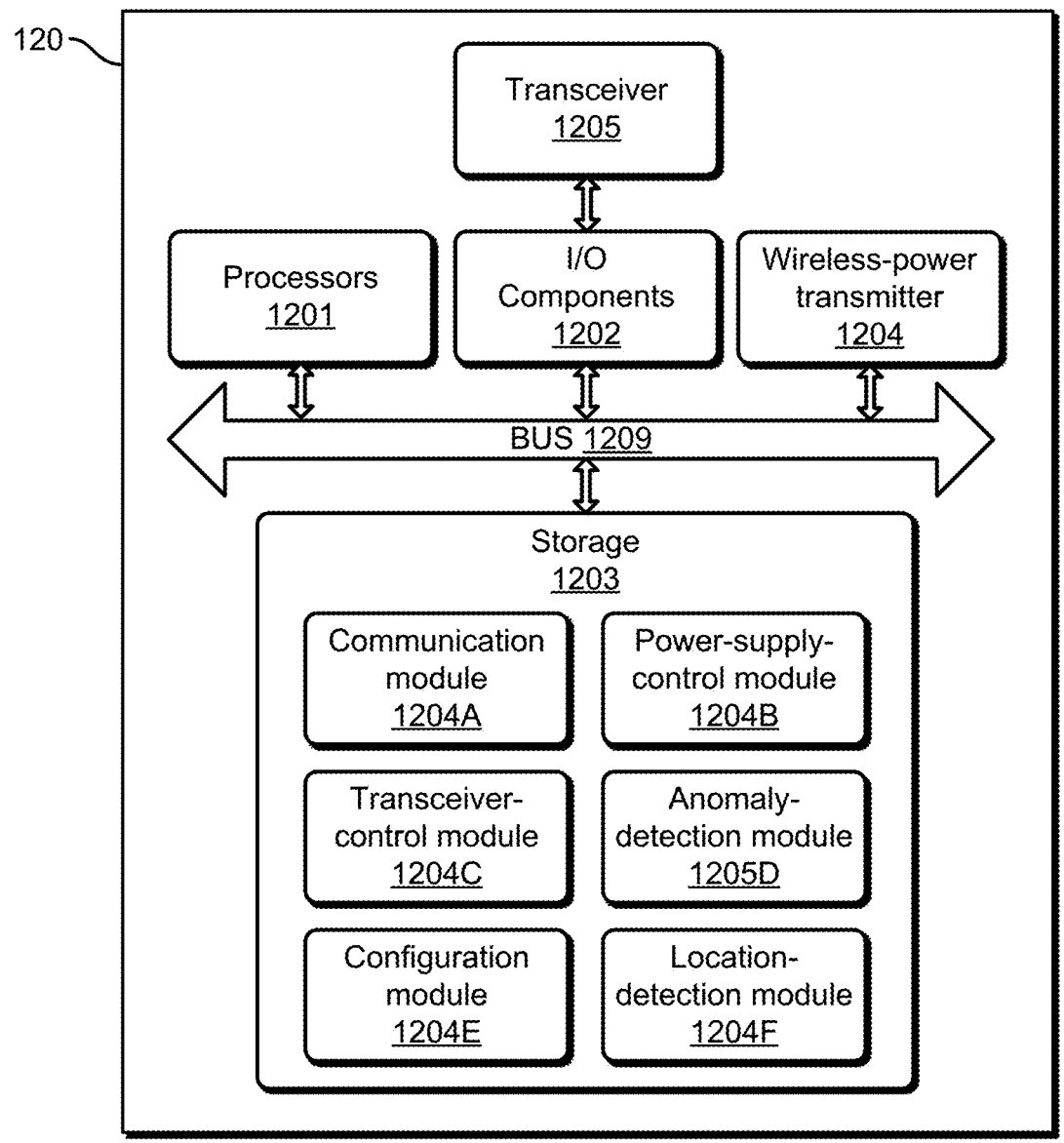
FIG. 15 illustrates an example embodiment of an anomaly-detection device.

FIG. 15 illustrates an example embodiment of an anomaly-detection device. The anomaly-detection device 120 includes one or more processors 1201, I/O components 1202, storage 1203, a wireless-power transmitter 1204, a transceiver 1205, and a bus 1209.

The one or more processors 1201 include one or more central processing units (CPUs), which may include one or more microprocessors (e.g., a single core microprocessor, a multi-core microprocessor); one or more graphics processing units (GPUs); one or more tensor processing units (TPUs); one or more application-specific integrated circuits (ASICs); one or more field-programmable-gate arrays (FPGAs); one or more digital signal processors (DSPs); or other electronic circuitry (e.g., other integrated circuits).

The I/O components 1202 include communication components (e.g., a graphics card, a network-interface controller) that can communicate with one or more computing devices (e.g., desktop computers, laptop computers, servers, tablet computers, smartphones), one or more networks, and input or output devices (not illustrated), which may include a display device, a keyboard, a mouse, a touch screen, a light pen, an optical-storage device, a scanner, a microphone, and a drive, for example. In this embodiment, the I/O components 1202 include components that allow the one or more processors to communicate with the transceiver 1205.

The storage 1203 includes one or more computer-readable storage media. As used herein, a computer-readable storage medium includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage 1203, which may include both ROM and RAM, can store computer-readable data or computer-executable instructions.

The anomaly-detection device 120 also includes a communication module 1204A, a power-supply-control module 1204B, a transceiver-control module 1204C, an anomaly-detection module 1205D, a configuration module 1204E, and a location-detection module 1204F. A module includes logic, computer-readable data, or computer-executable instructions. In the embodiment shown in FIG. 15, the modules are implemented in software (e.g., Assembly, C, C++, C#, Java, BASIC, Perl, Visual Basic, Python). However, in some embodiments, the modules are implemented in hardware (e.g., customized circuitry) or, alternatively, a combination of software and hardware. When the modules are implemented, at least in part, in software, then the software can be stored in the storage 1203. Also, in some embodiments, the anomaly-detection device 120 includes additional or fewer modules, the modules are combined into fewer modules, or the modules are divided into more modules.

The communication module 1204A includes instructions that cause the anomaly-detection device 120 to communicate with other devices, such as image-forming devices, embedded systems, manufacturing robots, and other computing devices. For example, some embodiments of the communication module 1204A include instructions that cause the anomaly-detection device 120 to receive an error code from an image-forming device, embedded system, or manufacturing robot.

The power-supply-control module 1204B includes instructions that cause the anomaly-detection device 120 to wirelessly supply power to one or more sensor arrays.

The transceiver-control module 1204C includes instructions that cause the anomaly-detection device 120 to communicate with (e.g., send data to, receive data from) one or more sensor arrays via the transceiver 1205. For example, some embodiments of the transceiver-control module 1204C include instructions that cause the anomaly-detection device 120 to perform at least some of the operations that are described in blocks B1305, B1330, B1345, and B1370 in FIG. 13.

The anomaly-detection module 1205D includes instructions that cause the anomaly-detection device 120 to detect one or more anomalies (e.g., anomaly signatures) in sensed data. For example, some embodiments of the anomaly-detection module 1205D include instructions that cause the anomaly-detection device 120 to perform at least some of the operations that are described in blocks B1310-B1315 and B1350-B1355 in FIG. 13.

The configuration module 1204E includes instructions that cause the anomaly-detection device 120 to determine the respective configurations of one or more sensor arrays. For example, some embodiments of the configuration module 1204E include instructions that cause the anomaly-detection device 120 to perform at least some of the operations that are described in blocks B1325 and B1365 in FIG. 13.

The location-detection module 1204F includes instructions that cause the anomaly-detection device 120 to detection a respective location where a group of sensed data was generated. For example, the location-detection module 1204F may detect the location based on a time when the group of sensor data was generated and a speed at which the generating sensor array travels on a path. Also for example, the location-detection module 1204F may detect the location based on coordinate data (e.g., GPS data) that is included in the group of sensed data.

Figure 16:
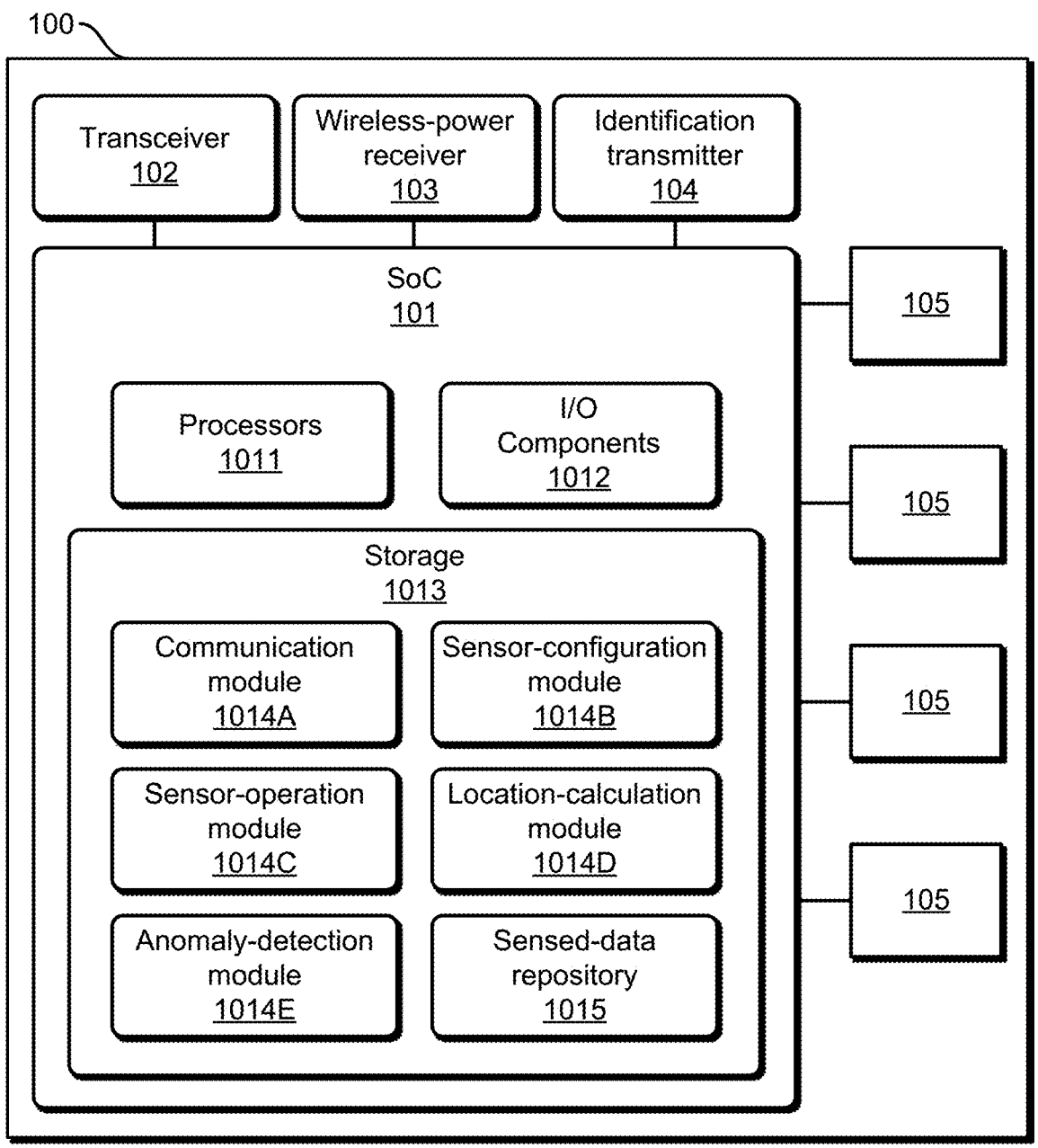
FIG. 16 illustrates an example embodiment of a sensor array.

FIG. 16 illustrates an example embodiment of a sensor array. The sensor array 100 includes a SoC 101, a transceiver 102, a wireless-power receiver 103, an identification transmitter 104, and multiple sensors 105. The SoC 101 includes one or more processors 1011, I/O components 1012, and applicable storage 1013 (storage that can be implemented in the sensor array). The storage 1013 includes a sensed-data repository 1015, which stores sensed data. The wireless-power receiver 103 may automatically activate when wireless power is being supplied.

The SoC 101 also includes the following modules: a communication module 1014A, a sensor-configuration module 1014B, a sensor-operation module 1014C, a location-calculation module 1014D, and an anomaly-detection module 1014E.

The communication module 1014A includes instructions that cause the sensor array 100 to communicate with other devices, such as other sensor arrays or anomaly-detection devices. For example, some embodiments of the communication module 1014A include instructions that cause the sensor array 100 to perform at least some of the operations that are described in blocks B905, B915, and B930 in FIG. 9; in blocks B1005, B1025, and B1050 in FIG. 10; in blocks B1205, B1222, B1223, B1224, B1230, B1231, B1232, B1233, B1240, B1242, and B1243 in FIG. 12; and in blocks B1421, B1423, B1430, B1460, B1470, B1475, and B1480 in FIG. 14.

The sensor-configuration module 1014B includes instructions that cause the sensor array 100 to configure the sensors 105, for example by adjusting the settings of one or more parameters of the sensors 105. Also for example, some embodiments of the sensor-configuration module 1014B include instructions that cause the sensor array 100 to perform at least some of the operations that are described in block B935 in FIG. 9, in blocks B1010 and B1045 in FIG. 10, in blocks B1210 and B1242 in FIG. 12, and in blocks B1440-B1450 in FIG. 14.

The sensor-operation module 1014C includes instructions that cause the sensor array 100 to control the sensors 105 to generate sensed data and to store the sensed data in the sensed-data repository 1015. For example, some embodiments of the sensor-operation module 1014C include instructions that cause the sensor array 100 to perform at least some of the operations that are described in blocks B910-B920 in FIG. 9, in blocks B1020-B1030 in FIG. 10, and in blocks B1220-B1221 in FIG. 12.

The location-calculation module 1014D includes instructions that cause the sensor array 100 to calculate a time or location for a respective group of sensed data. The time indicates when the group of sensed data was generated, and the location indicates where the group of sensed data was generated. For example, some embodiments of the location-calculation module 1014D include instructions that cause the sensor array 100 to perform at least some of the operations that are described in block B920 in FIG. 9, in block B1030 in FIG. 10, and in block B1221 in FIG. 12.

The anomaly-detection module 1014E includes instructions that cause the sensor array 100 to detect one or more anomalies (e.g., anomaly signatures) in sensed data. For example, some embodiments of the anomaly-detection module 1014E include instructions that cause the sensor array 100 to perform the operations that are described in block B1040 in FIG. 10.

What is claimed is:

1. A system comprising:
   a plurality of sensor arrays, wherein each sensor array of the plurality of sensor arrays includes multiple sensors, includes a wireless transceiver, includes one or more processors, and is configured to:
   generate sensed data, according to sensor settings, while moving along a path, wherein at least a part of the path is in or on an apparatus, and wherein the plurality of sensor arrays move relative to the apparatus while moving along the path;
   while moving along the path, transmit data to, and receive data from, other sensor arrays of the plurality of sensor arrays that are also moving along the path; and
   while moving along the path, change one or more of the sensor settings based on the received data.

2. The system of claim 1, wherein each of the plurality of sensor arrays is further configured to:
   detect an anomaly based on the sensed data.

3. The system of claim 2, wherein each of the plurality of sensor arrays is further configured to:
   transmit, while moving along the path, data that include a notification of the anomaly to the other sensor arrays of the plurality of sensor arrays.

4. The system of claim 1, wherein the sensed data include data sensed at different locations on the path.

5. The system of claim 1, wherein the one or more processors are configured to:
   determine if the received data were received from a sensor array, of the plurality of sensor arrays, that is downstream on the path; and
   in a case where the received data were received from a sensor array, of the plurality of sensor arrays, that is downstream on the path, change the one or more of the sensor settings based on the received data.

6. The system of claim 5, wherein the one or more processors are further configured to:
   in a case where the received data were received from a sensor array, of the plurality of sensor arrays, that is upstream on the path, not change the one or more of the sensor settings based on the received data.

7. The system of claim 1, wherein the data transmitted to the other sensor arrays include at least some of the sensed data and include respective locations on the path where the sensed data were generated.

8. The system of claim 1, wherein the multiple sensors include one or more of the following: a temperature sensor, an accelerometer, a light sensor, a vibration sensor, a sound sensor, a gyroscope, a color sensor, a humidity sensor, a voltage sensor, a chemical sensor, and a pressure sensor.

9. The system of claim 1, wherein the one or more of the sensor settings include a data-collection rate, a sensitivity, or a direction.

10. The system of claim 1, wherein the part of the path is in the apparatus.

11. The system of claim 10, wherein the apparatus is an image-forming apparatus.

12. A device comprising:
    multiple sensors that are configured to generate sensed data according to sensor settings;
    a wireless transceiver; and
    one or more processors that are configured to cause the device to
    while moving along a path, generate the sensed data according to the sensor settings, wherein at least a part of the path is inside an apparatus;
    while moving along the path, receive data from one or more sensors of one or more other devices that are also moving along the path; and
    while moving along the path, change one or more of the sensor settings based on the received data.

13. The device of claim 12, wherein the one or more processors are further configured to cause the device to:
    iteratively detect locations of the device along the path.

14. The device of claim 12, wherein the one or more processors are further configured to cause the device to:
    detect an anomaly based on the sensed data; and
    detect a location of the anomaly along the path.

15. The device of claim 14, wherein the one or more processors are further configured to cause the device to transmit a notification of the anomaly to another device that is moving along the path.

16. The device of claim 12, wherein the sensed data include groups of sensed data, and wherein each group of sensed data is generated at a different location along the path.

17. The device of claim 12,
    wherein the received data include a notification of an anomaly, and
    wherein the one or more processors are configured to cause the device to change the one or more of the sensor settings to detect the anomaly.

18. The device of claim 12, wherein the apparatus is an image-forming apparatus, and wherein the path includes an image-forming path in the image-forming apparatus.

19. A method comprising:
    while traveling along a path, controlling two or more sensors to generate sensed data according to one or more sensor settings, wherein at least some of the path is on or in an apparatus, and wherein the two or more sensors move relative to the apparatus while traveling along the path;
    while traveling along the path, receiving data from one or more sensor arrays that are traveling along the path; and
    while traveling along the path, reconfiguring the respective settings of two or more sensors based on the data received from the one or more sensor arrays.

20. The method of claim 19, further comprising:
    while traveling along the path, transmitting at least some of the sensed data to the one or more sensor arrays.

21. The method of claim 19, wherein the data received from the one or more sensor arrays include a notification of an anomaly, and wherein reconfiguring the two or more sensors includes reconfiguring the two or more sensors to detect the anomaly.

22. The method of claim 19, further comprising:

determining respective locations, on the path, of the one or more sensor arrays.

* * * * *